(12) United States Patent
Park et al.

(10) Patent No.: US 12,299,969 B2
(45) Date of Patent: May 13, 2025

(54) EFFICIENT VISION PERCEPTION

(71) Applicant: QUALCOMM Incorporated, San Diego, CA (US)

(72) Inventors: Hee Jun Park, San Diego, CA (US); Abhinav Goel, Lafayette, IN (US); Young Hoon Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 17/701,400

(22) Filed: Mar. 22, 2022

(65) Prior Publication Data

US 2023/0115371 A1    Apr. 13, 2023

Related U.S. Application Data

(60) Provisional application No. 63/252,544, filed on Oct. 5, 2021.

(51) Int. Cl.
| | |
|---|---|
| *G06V 10/82* | (2022.01) |
| *G06V 10/25* | (2022.01) |
| *G06V 20/40* | (2022.01) |
| *G06V 20/70* | (2022.01) |

(52) U.S. Cl.
CPC .............. *G06V 10/82* (2022.01); *G06V 10/25* (2022.01); *G06V 20/49* (2022.01); *G06V 20/70* (2022.01); *G06V 2201/07* (2022.01)

(58) Field of Classification Search
CPC ........ G06V 10/82; G06V 10/25; G06V 20/70; G06V 20/49; G06V 2201/07
USPC ........................................................ 382/103
See application file for complete search history.

(56) References Cited

U.S. PATENT DOCUMENTS

| 9,946,960 B1* | 4/2018 | Kim ........................ G06N 3/045 |
| 2016/0231411 A1* | 8/2016 | Kumar .................. G01S 3/7864 |

OTHER PUBLICATIONS

International Search Report and Written Opinion—PCT/US2022/075542—ISA/EPO—Feb. 8, 2023.
Kim J.Y., et al., "Real-Time Object Recognition with Neuro-Fuzzy Controlled Workload-Aware Task Pipelining", IEEE Micro, IEEE Service Center, Los Alamitos, CA, US, vol. 29, No. 6, Nov. 1, 2009, pp. 28-43, XP011299126, ISSN:0272-1732, The Whole Document.

(Continued)

*Primary Examiner* — Michael R Neff
(74) *Attorney, Agent, or Firm* — Polsinelli/Qualcomm

(57) ABSTRACT

Systems and techniques are provided for vision perception processing. An example method can include determining an attention demand score or characteristic per region of a frame from a sequence of frames; generating attention votes per region of the frame based on the attention demand score or characteristic per region, the attention votes per region providing attention demands and/or attention requests; determining an attention score or characteristic per region of the frame based on a number of attention votes from one or more computer vision functions; based on the attention score or characteristic per region of the frame, selecting one or more regions of the frame for processing using a neural network; and detecting or tracking one or more objects in the one or more regions of the frame based on processing of the one or more regions using the neural network.

30 Claims, 21 Drawing Sheets

(56) References Cited

OTHER PUBLICATIONS

Guo C., et al., "Motion-Appearance Interactive Encoding for Object Segmentation in Unconstrained Videos", arxiv.org, Cornell University Library, 201 Olin Library Cornell University Ithaca, NY 14853, Jul. 25, 2017, pp. 1-12, XP081278856, DOI: 10.1109/TCSVT.2019.2908779, The whole document.
Guo F., et al., "Video Saliency Detection Using Object Proposals", IEEE Transactions on Cybernetics, IEEE, Piscataway, NJ, USA, vol. 48, No. 11, Nov. 1, 2018, pp. 1-12, , XP011691849, ISSN: 2168-2267, DOI: 10.1109/TCYB.2017.2761361 [retrieved on Oct. 12, 2018], The whole document.
Partial International Search Report—PCT/US2022/075542—ISA/EPO—Dec. 9, 2022.
Zhang J., et al., "Uncertainty Inspired RGB-D Saliency Detection", Sep. 7, 2020, XP093003727, DOI: 10.1109/TPAMI.2021.3073564, pp. 1-16, [retrieved on Nov. 30, 2022], The whole document.

\* cited by examiner

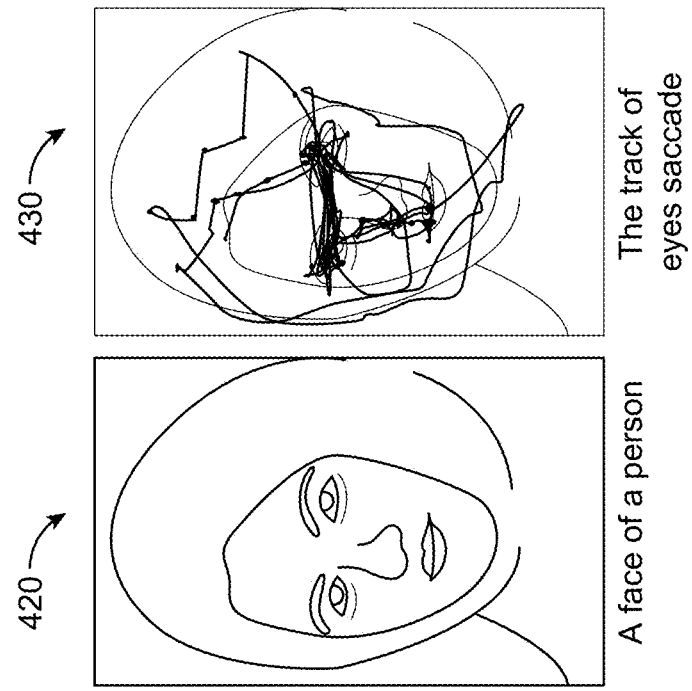
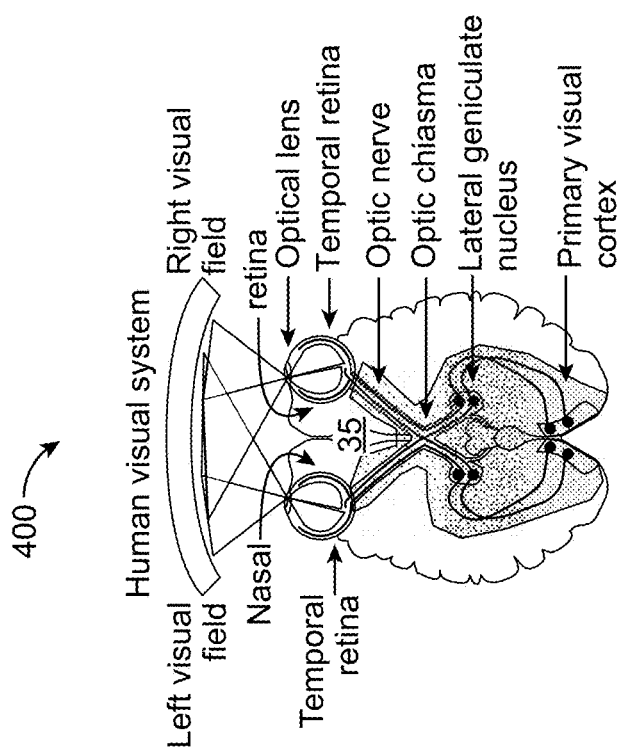
FIG. 4B
FIG. 4A

| Functions | Descriptions |
|---|---|
| Elemental attention factors | • Apply computer vision functions on the input image (examples: Depth, Optical Flow, Sky Detection, Occlusion/Disocclusion, Focus of Expansion, Visual Saliency)<br>• Extract elemental attention factors per-region in the grid of an input image (example: more attention for near distance, fast moving, non-sky, appearing from hiding, road vanishing point, distinctive colors & edges) These indicate factors that may draw human driver's attention. |
| Voting for attention demands (Attention vote per-region | • Calculate an attention demand score per-region in each conventional computer vision result. (convert many per-pixel value to one per-region value by average or max pooling)<br>• Generate attention votes (attention demands or attention requests) per-region based on the attention demand score<br>• Calculate an attention score per-region based on many attention votes from various computer vision functions. |
| Dynamic control of neural network load | • Determine the neural network load target based on dynamically changing constraints (SOC or system performance, power consumption, thermal-temperature conditions) |
| Regions-of-Attention | • Determine the regions-of-attention based on the attention votes and the neural network load target. |
| Per-region FPS (non-uniform FPS per image) | • Apply different FPS (frame-per-second) of neural network processing depending on regions-of-attention (higher FPS in a region having a higher attention score) |
| Selective processing in the neural network | • The neural network process only partial regions (regions-of-attention) of the image at non-uniform various FSP depending on regions. Skip many regions that do not need to be processed. |
| Result composition from partial neural network processing + adjustment by optical flow | • Generate object detection result for the full image by merging two information: (1) new object detection result from neural network processing on partial regions for the regions-of-attention + (2) adjustment of previous object detection result based on optical flow for outside of the regions-of-attention |

FIG. 5

EFFICIENT VISION PERCEPTION

CROSS-REFERENCE TO RELATED APPLICATIONS

This application claims priority to U.S. Provisional Application No. 63/252,544, filed on Oct. 5, 2021, entitled "EFFICIENT VISION PERCEPTION", the contents of which are hereby incorporated by reference in their entirety and for all purposes.

TECHNICAL FIELD

The present disclosure generally relates to video analytics for detecting and tracking objects. For example, aspects of the present disclosure relate to efficient vision perception based on per-region attention voting and frames per second.

BACKGROUND

Electronic devices are increasingly equipped with camera hardware to capture images and/or videos for consumption. For example, a computing device can include a camera (e.g., a mobile device such as a mobile telephone or smartphone including one or more cameras) to allow the computing device to capture a video or image of a scene, a person, an object, etc. The image or video can be captured and processed by the computing device (e.g., a mobile device, an IP camera, extended reality device, connected device, advanced driver assist system, etc.) and stored or output for consumption (e.g., displayed on the device and/or another device). In some cases, the image or video can be further processed for effects (e.g., compression, image enhancement, image restoration, scaling, framerate conversion, etc.) and/or certain applications such as computer vision, extended reality (e.g., augmented reality, virtual reality, and the like), object detection, object tracking, image recognition (e.g., face recognition, object recognition, scene recognition, etc.), feature extraction, authentication, and automation, among others.

In some cases, an electronic device can process images to detect and/or track objects, faces, and/or any other items depicted in the images. The object detection and/or tracking can be useful for various applications such as, for example, authentication, automation, gesture recognition, surveillance, extended reality, gaming, computer vision, among others. For example, object detection and tracking can be used by autonomous vehicles to perform autonomous driving operations. However, the systems and operations implemented for object detection and tracking can have high power and processing demands. The high power and processing demands can create thermal management problems which can negatively impact the computer system implementing such object detection and tracking operations. For example, thermal management problems can have a negative impact on a computer system's stability/reliability, performance, operation, etc.

BRIEF SUMMARY

Systems and techniques are described herein for efficient vision perception in computer vision. According to at least one example, a method is provided for efficient vision perception in computer vision. The method can include obtaining, from one or more computer vision functions, attention votes per region of a first frame from a set of frames, the attention votes per region providing at least one of attention demands and attention requests; determining an attention score per region of the first frame based on the attention votes per region, the attention score for each region being based on a respective number of attention votes associated with each region; based on the attention score per region of the first frame, selecting one or more regions of the first frame for processing using a neural network; and detecting one or more objects in the one or more regions of the first frame based on a processing of the one or more regions using the neural network.

According to at least one example, a non-transitory computer-readable medium is provided for efficient vision perception in computer vision. The non-transitory computer-readable medium can include instructions which, when executed by one or more processors, cause the one or more processors to obtain, from one or more computer vision functions, attention votes per region of a first frame from a set of frames, the attention votes per region providing at least one of attention demands and attention requests; determine an attention score per region of the first frame based on the attention votes per region, the attention score for each region being based on a respective number of attention votes associated with each region; based on the attention score per region of the first frame, select one or more regions of the first frame for processing using a neural network; and detect one or more objects in the one or more regions of the first frame based on a processing of the one or more regions using the neural network.

According to at least one example, an apparatus is provided for efficient vision perception in computer vision. The apparatus can include memory and one or more processors coupled to the memory, the one or more processors configured to obtain, from one or more computer vision functions, attention votes per region of a first frame from a set of frames, the attention votes per region providing at least one of attention demands and attention requests; determine an attention score per region of the first frame based on the attention votes per region, the attention score for each region being based on a respective number of attention votes associated with each region; based on the attention score per region of the first frame, select one or more regions of the first frame for processing using a neural network; and detect one or more objects in the one or more regions of the first frame based on a processing of the one or more regions using the neural network.

According to at least one example, another apparatus is provided for efficient vision perception in computer vision. The apparatus can include means for obtaining, from one or more computer vision functions, attention votes per region of a first frame from a set of frames, the attention votes per region providing at least one of attention demands and attention requests; determining an attention score per region of the first frame based on the attention votes per region, the attention score for each region being based on a respective number of attention votes associated with each region; based on the attention score per region of the first frame, selecting one or more regions of the first frame for processing using a neural network; and detecting one or more objects in the one or more regions of the first frame based on a processing of the one or more regions using the neural network.

In some aspects, the method, non-transitory computer-readable medium, and apparatuses described above can determine one or more features in the first frame; determine an attention demand score or characteristic per region of the first frame at least partly based on the one or more features in the first frame; and determine the attention score per region based on the attention demand score or characteristic per region.

In some examples, the one or more features can include depth information, optical flow information, sky detection information, an occlusion map, a disocclusion map, focus of expansion information, and/or visual saliency information.

In some aspects, the method, non-transitory computer-readable medium, and apparatuses described above can detect one or more additional objects in one or more additional regions of the first frame using an optical flow algorithm. In some examples, detecting the one or more additional objects in the one or more additional regions of the first frame can include processing the one or more additional regions using the optical flow algorithm and refraining from processing the one or more additional regions using the neural network.

In some cases, the one or more computer vision functions can include depth estimation, optical flow estimation, sky detection, occlusion detection, disocclusion detection, focus of expansion estimation, and/or visual saliency detection.

In some examples, detecting the one or more objects in the one or more regions of the first frame can include refraining from using the neural network to process one or more additional regions of the first frame; and after processing a predetermined number of frames from the set of frames, processing, using the neural network, a portion of a second frame, the portion of the second frame corresponding to at least one of the one or more additional regions.

In some aspects, the method, non-transitory computer-readable medium, and apparatuses described above can generate, using one or more features of the first frame, a classification and bounding box for the one or more objects.

In some examples, detecting the one or more objects in the one or more regions can include processing the one or more regions using the neural network and process one or more additional regions of the first frame without using the neural network.

In some cases, a combination of the one or more regions of the first frame is smaller than a combination of all regions of the first frame, and the one or more regions of the first frame can include one or more regions of attention determined in the first frame.

In some aspects, the method, non-transitory computer-readable medium, and apparatuses described above can determine a neural network load target for the neural network based on one or more constraints.

In some examples, the one or more constraints can include a system performance, a system component performance, a power consumption, and/or temperature conditions associated with a computing device.

In some aspects, the method, non-transitory computer-readable medium, and apparatuses described above can apply a different frames-per-second rate of neural network processing for different frame regions. In some examples, the different frames-per-second rate is based on the selected one or more regions of the first frame.

In some cases, the one or more regions can include a first region and a second region, the first region can have a higher attention score than the second region, and the first region having the higher attention score can be processed using the neural network at a higher frames-per-second rate than the second region having a lower attention score.

In some aspects, the method, non-transitory computer-readable medium, and apparatuses described above can use the neural network to process only one or more partial regions of the set of frames according to one or more respective processing rates. In some examples, the one or more partial regions of the set of frames can include the one or more regions of the first frame.

In some aspects, the method, non-transitory computer-readable medium, and apparatuses described above can determine, based on dynamically changing constraints for a compute load capability, a number of regions to process using the neural network and one or more frames-per-second rates for processing frame regions using the neural network.

In some aspects, the method, non-transitory computer-readable medium, and apparatuses described above can determine that a total processor load associated with the number of regions and the one or more frames-per-second rates meets the dynamically changing constraints.

In some aspects, each of the apparatuses described above is, can be part of, or can include a mobile device, a smart or connected device, a camera system, a computer system, an advanced driver assist computer, a robotic system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 4A is a diagram illustrating an example of a human visual system, in accordance with some examples of the present disclosure;

FIG. 4B illustrates an image of a face and an example tracking of eyes saccades for the face, in accordance with some examples of the present disclosure;

FIG. 5 is a table illustrating example functions of an example computer-based vision perception system that implements per-region attention voting and processing rates, in accordance with some examples of the present disclosure;

DETAILED DESCRIPTION

Figure 1:
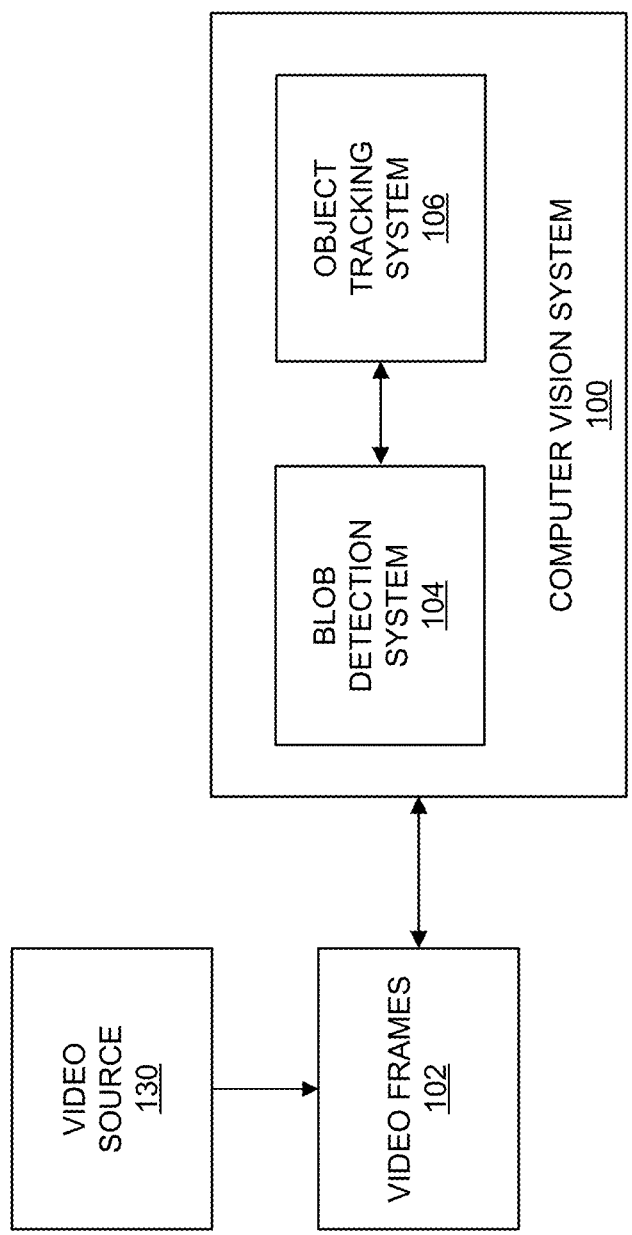
FIG. 1 is a block diagram illustrating an example of a computer vision (CV) system, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Electronic devices (e.g., advanced driver assist systems, mobile phones, wearable devices (e.g., smart watches, smart glasses, etc.), computers, extended reality (XR) devices (e.g., virtual reality (VR) devices, augmented reality (AR) devices, mixed reality (MR) devices, and the like), connected devices, servers, analytics systems, camera systems, etc.) can implement cameras to detect, track, and/or recognize events and/or objects of interest. For example, electronic devices can implement cameras that can capture images of a scene. The images of the scene can by used to detect, track, and/or recognize events and/or objects in the scene. In some examples, an electronic device can implement a video analytics system that can obtain a sequence of video frames from a video source, such as a camera, and process the video sequence to perform a variety of tasks such as, for example, object detection, tracking, object recognition, etc.

For example, a video analytics system can detect and track moving objects in a scene. In some cases, the video analytics system can generate a bounding box (or any other shape) around a detected object. A video analytics system as described herein can be implemented in a variety of contexts and applications. In some examples, a video analytics system can be implemented by an advanced driver-assistance system (ADAS) of a vehicle to detect and track objects in order to help the ADAS perform autonomous driving operations.

In some examples, a video analytics system can use computer vision to acquire, process, analyze, and understand images/frames and data from the real world in order to produce information such as decisions and outputs. Visual perception in the context of a computer system, such as a video analytics system, is the ability of the computer system to receive and interpret visual stimuli from a scene. However, there are numerous challenges in visual perception in the context of computer systems. For example, increasing demands for high resolution image data and/or frames-per-second (FPS) processing can result in increased power consumption and thermal issues at the computer system. This can create a variety of issues and can be problematic in a variety of applications. Generally, the high power consumption and thermal issues often experienced in visual perception systems for autonomous driving can create significant challenges in performance, stability, accuracy, etc., for ADAS systems used by autonomous vehicles.

Much of the research in computer vision (CV) focuses on improving the loss and accuracy (ACC) of deep neural networks (DNNs) used for computer vision. Ways to improve the ACC generally include using deeper, more power-hungry DNNs which can exacerbate the power consumption and thermal issues previously noted. For example, higher power consumption can result in problems in thermal management, which is used to maintain the computer system (and/or its components) working within the thermal power envelope and thus ensure sustained/stable performance. However, in many cases, implementing deeper, more power-hungry DNNs may not be a sustainable solution, and the thermal management difficulties associated with the higher power consumption of deeper DNNs can create a number of problems.

In some aspects of the present disclosure, systems, apparatuses, methods (also referred to as processes), and computer-readable media (collectively referred to herein as "systems and techniques") are described for efficient vision perception in the context of computer vision. In some examples, the systems and techniques described herein can implement efficient vision perception based on per-region attention voting, as further described below. The efficient vision perception can increase CV performance, accuracy, efficiency, stability, thermal management, etc.

In some examples, the systems and techniques described herein can perform efficient image processing to detect objects and features of a scene. In some cases, the systems and techniques described herein can perform vision perception and increase a processing performance, reduce a thermal power footprint, reduce resource burdens, and/or reduce a processing complexity by limiting or reducing the portions of a frame processed using a neural network(s). For example, the systems and techniques described herein can increase performance and/or efficiency by using a neural network(s) to process regions of interest in a frame(s) and skipping use of the neural network(s) to process other regions in the frame(s).

In some examples, the systems and techniques described herein can perform efficient image processing using low-level CV functions (e.g., depth estimation, optical flow estimation, visual saliency estimation, focus of expansion estimation, sky detection, occlusion/disocclusion detection, etc.) to understand an imaged scene (e.g., a depth, an optical flow, a sky, occlusions, disocclusions, salient visual features, etc.), identify regions-of-interest in the scene, and a use a neural network to process only the regions-of-interest rather than using the neural network to process the entire image frame. By reducing the amount of image data processed using the neural network, the systems and techniques described herein can increase a processing efficiency and performance, reduce thermal requirements, reduce resource requirements/burdens, etc. Moreover, by using the neural network to process regions-of-interest in a frame, the systems and techniques described herein can increase and/or maintain an accuracy and/or reliability of the processing results.

In some cases, the systems and techniques can receive an input frame from an image capture device (e.g., an image sensor), use low-level CV functions to understand the overall scene (e.g., detect a depth, an optical flow, a sky, occlusions, disocclusions, salient visual features, etc.). The systems and techniques described herein can identify regions-of-interest in a frame depicting the scene based on low-level features of the scene detected using the low-level CV functions. The systems and techniques described herein may only process the regions-of-interest using a neural network(s), as opposed to using the neural network(s) to process the entire frame. In some cases, the systems and techniques described herein can dynamically adjust processing of an entire frame and/or portions of frames.

As described in more detail herein, a CV system can perform vision perception and/or video analytics to detect and/or track objects in an image of a scene. In some examples, the CV system can track one or more objects or blobs in a video sequence. For example, in some cases, the CV system can track one or more objects or blobs in a video sequence using one or more bounding boxes (and/or any other shapes). The CV system can implement various strategies to increase vision perception efficiency, as described herein. For example, in some cases, the CV system can implement a neural network to detect and/or track objects depicted in images of a scene. A neural network can often consume a significant amount of system resources and increase the thermal and processing requirements/burdens on the system.

In some examples, to increase efficiency, the CV system may only use the neural network to process certain regions of an image frame, such as regions-of-interest in the image frame, while using a less power-hungry algorithm to process other regions of the image frame. In some cases, the CV system may use the neural network to process some image frames and skip using the neural network to process other image frames. The CV system can use the neural network to detect and/or track objects depicted in the image frames of the scene.

Various aspects of the application will be described with respect to the figures.

FIG. 1 is a block diagram illustrating an example of a computer vision (CV) system 100. The CV system 100 can perform computer vision, image processing, video analytics, visual/vision perception, etc., for a variety of applications, such as automation (e.g., autonomous driving, robotics, manufacturing, etc.), extended reality, tracking, security, gaming, etc.

The CV system 100 can receive video frames 102 from a video source 130. A video frame can also be referred to herein as a video picture, a picture, or an image. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include a camera or multiple cameras. In an illustrative example, multiple cameras can be located throughout an environment or structure, such as a vehicle, and can provide the video frames 102 to the CV system 100. For instance, the cameras can be placed at various fields of view within an environment or vehicle so that video processing can be performed based on the captured video frames 102 of the environment or vehicle.

In some examples, the CV system 100 and the video source 130 can be part of the same computing device. In some examples, the CV system 100 and the video source 130 can be part of separate computing devices. In some examples, the computing device (or devices) can include one or more wireless transceivers for wireless communications. The computing device (or devices) can include an electronic device, such as an advanced driver-assistance system (ADAS), a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a server, a display device, a digital media player, a video gaming console, a video streaming device, an extended reality device, or any other suitable electronic device.

The CV system 100 can include a blob detection system 104 and an object tracking system 106. Object detection and tracking allows the CV system 100 to provide features, such as the video analytics features described herein. For example, intelligent motion detection, intrusion detection, autonomous driving, and other processes can use the results from object detection and tracking to generate events, decisions, outputs, etc. Moreover, certain features such as people, vehicles, object counting and classification, etc., can be simplified based on the results of object detection and tracking.

The blob detection system 104 can detect one or more blobs in one or more video frames (e.g., video frames 102) of a video sequence. The object tracking system 106 can track the one or more blobs across frames of the video sequence. As used herein, a blob refers to image pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof.

In some examples, a bounding box can be associated with a blob. In some examples, a tracker can also be represented by a tracker bounding region. A bounding region of a blob or tracker can include a bounding box, a bounding circle, a bounding ellipse, or any other suitably-shaped region representing a tracker and/or a blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blobs can be detected and tracked by the CV system 100. Using the blob detection system 104 and the object tracking system 106, the CV system 100 can perform blob generation and detection for each frame or picture of a video sequence. For example, the blob detection system 104 can perform background subtraction for a frame, and can detect foreground pixels in the frame. Foreground blobs can be generated from the foreground pixels using, for example, morphology operations and spatial analysis.

The CV system 100 can implement a number of object detection frameworks. For example, in some cases, the CV system 100 can implement one or more neural networks and algorithms such as a convolutional neural network (CNN), a region-based CNN (R-CNN), a fast R-CNN, a faster R-CNN, a single shot detector (SSD), a You Only Look Once (YOLO), non-maximum suppression (NMS), semantic segmentation algorithms, focus-of-expansion estimation algorithms, visual salient feature extraction algorithms, computer vision algorithms, etc.

The components shown in FIG. 1 with respect to the CV system 100 are illustrative examples provided for explanation purposes. In other examples, the CV system 100 can include more or less components than those shown in FIG. 1. While the CV system 100 is shown to include certain components, one of ordinary skill will appreciate that the CV system 100 can include more or fewer components than those shown in FIG. 1. For example, the CV system 100 can include, in some instances, one or more memory devices (e.g., RAM, ROM, cache, and/or the like), one or more networking interfaces (e.g., wired and/or wireless communications interfaces and the like), one or more display devices, one or more caches, one or more storage devices, one or more processing devices (e.g., central processing unit, image signal processor, digital signal processor, graphics processing unit, application-specific integrated circuit, field-programmable gate array, etc.), and/or other hardware or processing devices that are not shown in FIG. 1. An illustrative example of a computing device and/or hardware components that can be implemented with the CV system 100 are described below with respect to FIG. 19.

Figure 2:
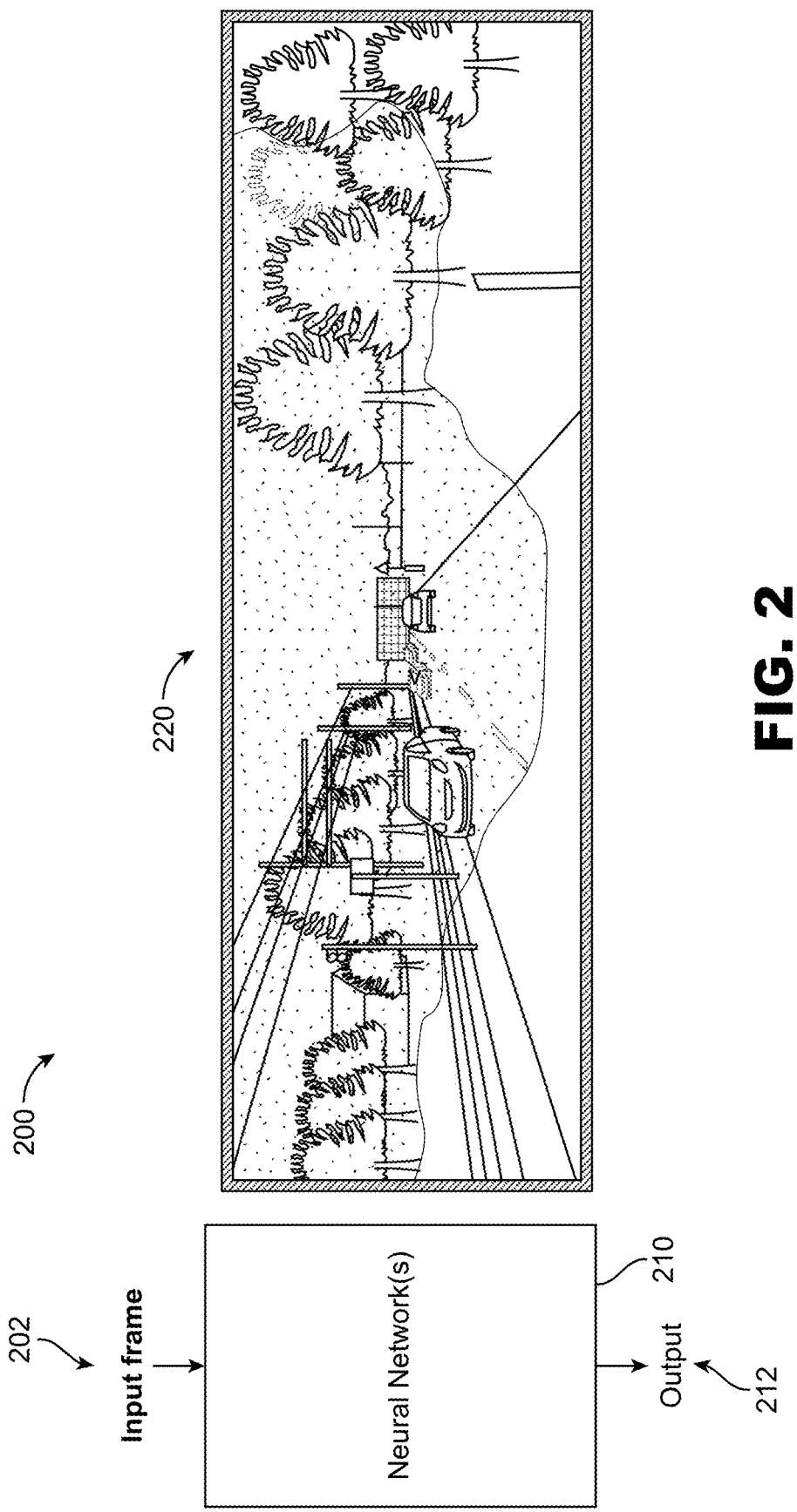
FIG. 2 is a diagram illustrating an example object detection framework for vision perception, in accordance with some examples of the present disclosure.

FIG. 2 is a diagram illustrating an example object detection framework 200 for vision perception. In some examples, the CV system 100 can implement the object detection framework 200 to detect and track objects in an image of a scene, such as scene 220 shown in FIG. 2.

In the example of FIG. 2, the object detection framework 200 can include a neural network 210 configured to process input frames 202 and detect objects in the input frames 202. The input frames 202 can include video/image frames of a scene (e.g., scene 220) captured by an image capture device (e.g., an image sensor, a mobile device with a camera(s), a camera system, etc.). The image capture device can be part of the CV system 100 or separate from the CV system 100.

The neural network 210 can be configured to perform one or more functions such as, for example and without limitation, semantic segmentation, object detection, video and/or object tracking, pose estimation, object recognition, event detection, scene reconstruction, motion estimation, scene modeling, image restoration, indexing, classification, learning, edge extraction, noise reduction, transformations, pattern recognition, facial recognition, optical flow, bird's eye view (BEV) segmentation and/or object detection, matching, decision making, vision perception, and/or any other computer-based operations and/or functions.

The neural network 210 can include any type of neural network such as, for example and without limitation, a CNN, an R-CNN, a fast R-CNN, a faster R-CNN, an SSD, a YOLO, a Mask CNN, a Mask R-CNN, a classification network, and/or any other type of neural network. In one non-limiting example, the neural network 210 can include a backbone configured to extract features in the input frames 202 and/or a neural network portion configured for image classification, a neck configured to extract additional features (e.g., more elaborate features, etc.), and/or a head or detection head configured to compute and/or generate the output of the neural network 210.

In some cases, the neural network 210 and/or a backbone of the neural network 210 can process an entire input frame of high resolution at a high frames-per-second (FPS) rate. This can result in a significant computation intensive load and can cause power and thermal issues. As further described herein, in some examples, to reduce the computation load and/or the power and thermal issues, the neural network 210 may only process certain captured frames and skip processing other captured frames; and/or may only process a subset of regions of an input frame, such as a region-of-interest, and skip processing other regions of the input frame.

The neural network 210 can process the input frames 202 and generate an output 212. The output 212 can include an object detection output that identifies one or more objects detected in the input frames 202. In some examples, the output 212 can include classifications (e.g., object/blob classifications, etc.) and/or bounding boxes (and/or any other shapes) of objects detected in the input frames 202. For example, in some cases, the neural network 210 can process the input frames 202 and output classifications and bounding boxes of objects in the input frames 202.

In some cases, for every frame captured and/or received, the neural network 210 can process the entire frame, which can result in a high computation load and an increase in power and thermal issues, as previously mentioned. In some examples, to increase a processing efficiency, reduce a computation load on the device (e.g., on the CV system 100), reduce power and thermal issues, etc., the neural network 210 may only process a portion of each frame (e.g., less than the entire frame), such as one or more regions-of-interest (ROI) of the frame, and/or may only process a subset of frames captured and/or received. In some cases, the CV system 100 can implement less complex and/or compute/resource intensive algorithms and/or operations to process those frames and/or regions of frames that are not processed by the neural network 210.

As previously explained, vision perception workloads can be processed by neural networks, such as neural network 210. Neural network workloads can often result in the largest portion of execution time and power consumption in vision perception processing, such as ADAS vision perception processing or any other vision perception processing.

Figure 3:
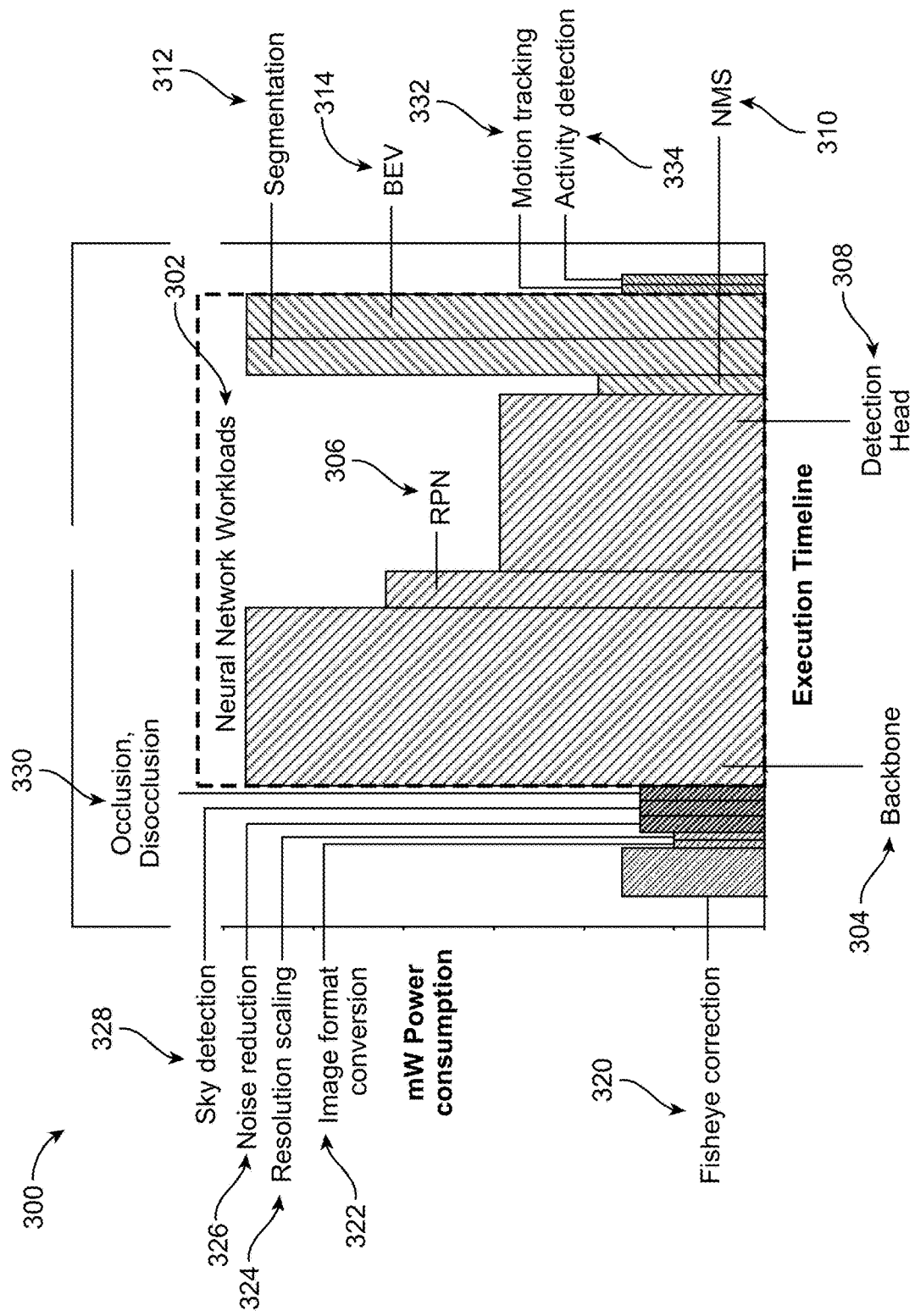
FIG. 3 is a graph illustrating example power consumptions and execution times of example vision perception workloads, in accordance with some examples of the present disclosure.

FIG. 3 is a graph 300 illustrating example power consumptions and execution times of example vision perception workloads. In this example, the graph 300 illustrates power consumption and execution times of neural network workloads 302, fisheye correction workloads 320, image format conversion workloads 322, resolution scaling workloads 324, noise reduction workloads 326, sky detection workloads 328, occlusion/disocclusion workloads 330, motion tracking workloads 332, and activity detection workloads 334. The neural network workloads 302 in this example include a backbone workload 304, an RPN workload 306, a detection head workload 308, an NMS workload 310, a segmentation workload 312, and a BEV object detection workload 314.

As shown in the graph 300, the neural network workloads 302 can consume more power and execution time than the other workloads. The neural network workloads 302 often contribute more than the other workloads to the overall processing time on the device. Moreover, there can be various problems with large vision perception workloads. For example, large vision perception workloads can be associated with various performance issues as it is challenging to support high resolutions and FPS rates. Many times, there can be exploding loads for neural networks beyond the processor's capability at the device. There can also be power issues as it is challenging to keep the power supply size at an smaller level, and the associated power consumption and density can cause thermal issues. Thermal issues can also arise as it can be challenging to sustain the workload at high ambient temperatures and hot spots in the processor's (e.g., neural network signal processors and/or any other processors) multi-bit multiply-accumulate (MAC) array.

In some examples, to reduce the size of the neural network workload in the computer system (e.g., CV system 100) without compromising accuracy, the systems and techniques described herein can implement a particular or alternate vision perception workflow. The vision perception workflow can implement aspects similar to and/or inspired by the human vision system. The resulting vision provided by the systems and techniques described herein can be more efficient than other techniques.

FIG. 4A is a diagram illustrating an example of a human visual system 400, which illustrates some of the characteristics, qualities, benefits, etc., of the visual system in humans. The human visual system 400 includes the eyes and parts of the central nervous system which, together, allow humans to detect and interpret information from the optical spectrum. The human visual system 400 can allow humans to identifying objects in a scene, perceive motion, recognize patterns, integrate visual information, detect and process visible light, etc. Moreover, humans can perform hierarchical vision perception (e.g., from low level perception to high level cognition) where different parts of the brain process different bits of information with different amounts of effort.

Visual attention and eyes can saccade to focus on a smaller, important region of a view instead of the entire view. For example, FIG. 4B illustrates an image of a face 420 and an example tracking 430 of eyes saccades for the face 420. Moreover, with the human visual system 400, there is also working memory retaining and updating information for perceived objects. Humans also selectively process visual information, and generally focus their attention on a smaller area of vision (e.g., smaller than the entire area of vision). For example, in the context of driving, a human has a focus attention on regions having high priority information relevant to and needed for driving. Typically, a human driving in a scene may have certain driver eye movement patterns while driving. For example, the driver eye movement patterns typically reflect the driver's focus attention on smaller areas of vision of higher priority.

As previously mentioned, the systems and techniques described herein can implement a vision perception workflow that includes aspects similar to and/or inspired by the human vision system. For example, the systems and techniques described herein can implement a vision perception workflow that selectively processes visual information. To illustrate, the vision perception workflow can use a neural network to process and/or focus attention on smaller regions of interest.

In some examples, the systems and techniques described herein can implement efficient vision perception based on per-region attention voting and FPS. FIG. 5 is a table 500 illustrating example functions of an example computer-based vision perception system that implements per-region attention voting and FPS. As shown, the example functions include elemental attention factors 502, voting for attention demands 504 (e.g., attention vote per region), dynamic control neural network load functions 506, regions-of-attention functions 508, per-region FPS 510 (e.g., non-uniform FPS per image), selective processing 512 in the neural network, and result composition 514 from partial neural network processing and adjustment by optical flow.

In some examples, the elemental attention factors 502 can apply computer vision functions (e.g., depth estimation, optical flow, sky detection, occlusion/disocclusion detection, focus of expansion estimation, visual saliency detection, etc.) on an input image. In some cases, the elemental attention factors 502 can extract elemental attention factors per region in a grid of an input image (e.g., more attention for near distance regions, faster moving regions, non-sky regions, objects appearing from hiding, road vanishing points, distinctive colors and edges, etc.). These are example factors that may draw a human's attention and can similarly receive attention by the computer system.

The voting for attention demands 504 (e.g., attention vote per region) can calculate an attention demand score per-region in each computer vision result. In some cases, the voting for attention demands 504 can convert per-pixel values to per-region value. In some examples, the voting for attention demands 504 can convert many per-pixel values to a per-region value by averaging or max pooling. The voting for attention demands 504 can generate attention votes (attention demands or attention requests) per-region based on an attention demand score, and calculate an attention score per-region based on attention votes from one or more computer vision functions.

The dynamic control neural network load functions 506 can determine the neural network load target. In some examples, the dynamic control neural network load functions 506 can determine the neural network load target based on dynamically changing constraints (e.g., system-on-chip (SOC) or system performance, power consumption, thermal-temperature conditions, etc.).

The regions-of-attention functions 508 can determine regions-of-attention based on the attention votes and the neural network load target. The per-region FPS 510 (e.g., non-uniform FPS per image) can apply different FPS rates of neural network processing depending on the regions-of-attention (e.g., higher FPS rates can be applied for regions having a higher attention score). In the selective processing 512 in the neural network, the neural network (e.g., neural network 210) may process partial regions (e.g., regions-of-attention) of an image at non-uniform FPS rates and/or varying FPS rates depending on regions, and can skip processing other regions of the image.

The result composition 514 from partial neural network processing and adjustment by optical flow can generate object detection results for the full image by merging a new object detection result from the neural network processing on partial regions for the regions-of-attention and adjustment of the previous object detection result based on optical flow for image portions outside of the regions-of-attention. In general, object detection from neural networks is more accurate and reliable than the adjusted location from the previous object detection with optical flow, while the processing load and power consumption of optical flow calculation is smaller than that of neural networks.

Figure 6A:
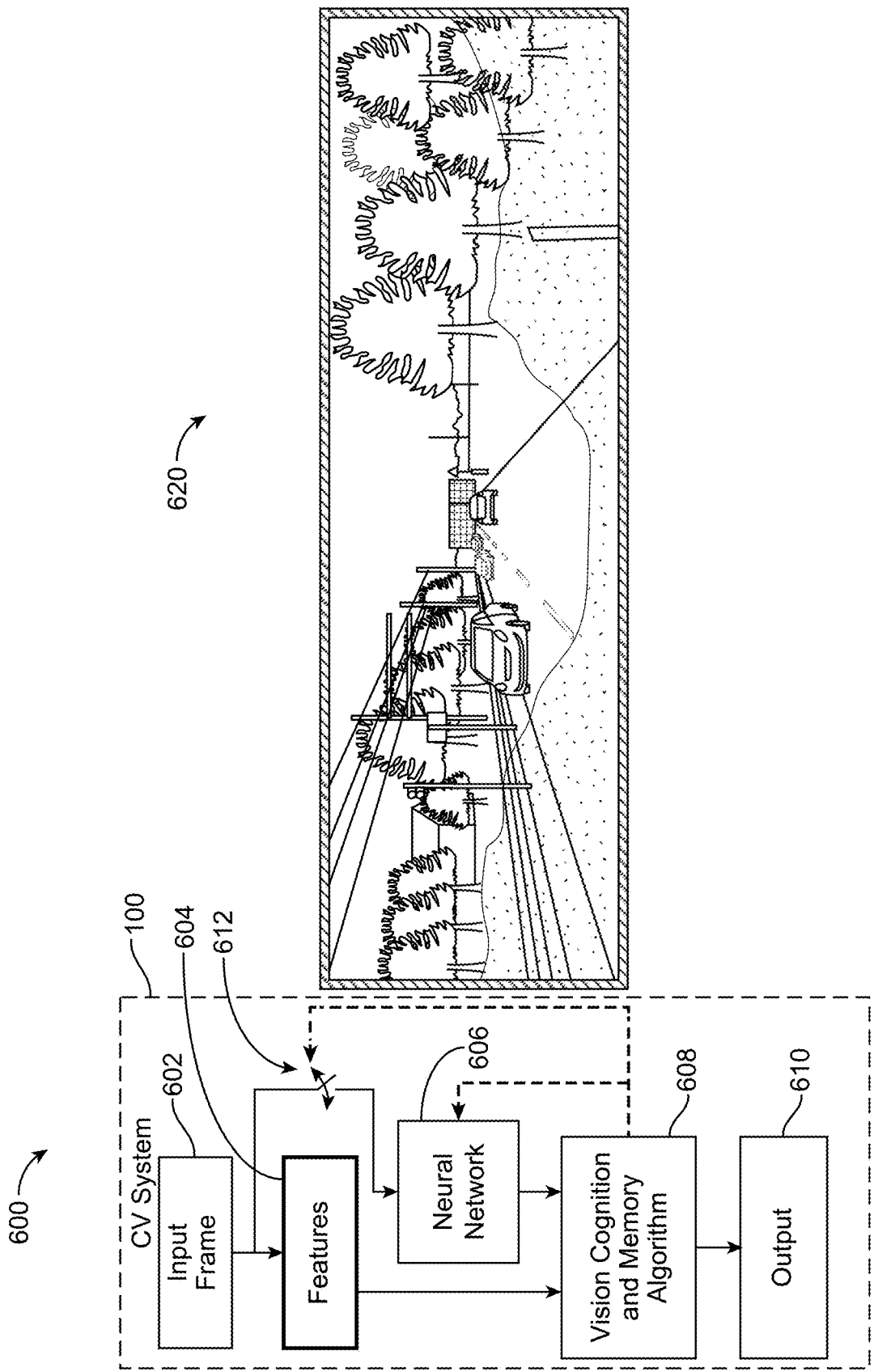
FIG. 6A is a diagram illustrating an example flow for vision perception processing, in accordance with some examples of the present disclosure.

FIG. 6A is a diagram illustrating an example flow 600 for vision perception processing, in accordance with some examples of the present disclosure. The example flow 600 can be implemented by a computer system(s), such as the CV system 100 shown in FIG. 1. In some examples, the neural network 606 can represent the same neural network as the neural network 210 shown in FIG. 2. In other examples, the neural network 606 can represent any other neural network.

In this example, the CV system 100 can obtain input frames 602 for vision perception processing. In some cases, the CV system 100 can receive the input frames 602 from an image capture device of the CV system 100. In other cases, the CV system 100 can receive the input frames 602 from a separate device, such as a server or an image capture device that is separate from the CV system 100. The input frames 602 can depict a scene 620. In FIG. 6A, the scene 620 is a driving scene encountered by a vehicle implementing the example flow 600 and CV system 100. However, in other examples, the input frames 602 can depict any other scene.

The CV system 100 can receive the input frames 602 and extract features 604 from the input frames 602. The CV system 100 can implement any feature extraction algorithm and/or technique to extract the features 604 from the input frames 602. The CV system 100 can use the features 604 to understand the scene 620 depicted in the input frames 602. For example, the CV system 100 can use the features 604 to determine a depth map for the scene 620 depicted in the input frames 602, detect a sky in the input frames 602 of the scene 620, estimate motion (e.g., an optical flow) in the scene 620 and/or motion of items (e.g., objects, surfaces, edges, etc.) in the scene 620, detect any occlusions and/or disocclusion in the scene 620, estimate a heading or direction of moving items in the scene 620, and/or determine any other aspects or characteristics of the scene 620.

In some examples, the features 604 can be or can include low-level features extracted from the input frames 602. In some cases, the CV system 100 can implement low-level computer vision functions to extract and/or detect the low-level features in the input frames 602. Non-limiting examples of low-level features can include depth information (e.g., depth estimates, a depth map, etc.), an optical flow, a sky detection result, a detected occlusion and/or disocclusion, a foreground region(s), a background region(s), a speed of an object(s) in the scene 620, a focus of expansion, a disparity map, edges, colors, salient visual features, a segmentation map, and/or any other low-level features. Moreover, non-limiting examples of low-level computer vision functions can include depth estimation, optical flow estimation, sky detection, occlusion and/or disocclusion detection, semantic segmentation, focus of expansion estimation, foreground estimation, background estimation, salient visual feature extraction, edge detection, color detection, and/or any other low-level computer vision functions.

The CV system 100 can extract features (e.g., low level features) from every input frame received. For example, the CV system 100 can implement a feature extractor to extract features from each of the input frames 602. The feature extractor can process every input frame to extract low level features from each frame. The feature extractor can provide the extracted features (e.g., features 604) to a vision cognition and memory algorithm 608, as further described below.

The neural network 606 can also process the input frames 602 (or a subset of the input frames 602) to detect objects in the scene 620 depicted in the input frames 602. As previously explained, the neural network processing can consume a high amount of power, resources, compute, etc. Thus, in some examples, to increase efficiency and reduce the processing burden on the CV system 100, the neural network 606 may only process a subset or portion of each input frame (or a subset or portion of every n number of frames), such as a region(s) of attention (e.g., a region of interest) in the input frame. In some cases, if an input frame is the first frame being processed by the neural network 606 and/or the CV system 100, the neural network 606 can process the entire input frame (e.g., every pixel of the frame) and, for any subsequent frame, the neural network 606 may process only a portion of the frame (e.g., one or more regions of attention in the frame) while skipping processing of any other portions of the frame.

In some cases, the neural network 606 can process a subset of the input frames 602 (e.g., less than all the input frames 602) while skipping processing other input frames (e.g., while refraining from processing other input frames). For example, the neural network 606 can process every n number of input frames based on a FPS rate determined by the vision cognition and memory algorithm 608, and skip other input frames (e.g., refrain from processing other input frames). In some cases, the neural network 606 may only process a portion (e.g., less than all) of each processed frame from the n number of input frames processed by the neural network 606. In some examples, the FPS rate can be determined based on one or more constraints such as, for example, system performance, power consumption, thermal-temperature conditions, resource availability, processing requirements, performance requirements, expected latencies, etc.

A vision cognition and memory algorithm 608 of the CV system 100 can use the features 604 and information from the neural network 606 (e.g., object detection results, tracking results, etc.) to determine one or more regions of attention in the input frames 602. The one or more regions of attention can include any regions of interest that should be processed by the neural network 606 to detect and/or track any objects in those regions of interest. For example, the vision cognition and memory algorithm 608 can determine the most important region(s) of the input frame 602, and identify the most important region(s) as the region(s) of attention to be processed by the neural network 606.

To illustrate, in an example use case where the CV system 100 is used by an autonomous vehicle for autonomous driving operations, the most important regions of the input frames 602 can correspond to elements (e.g., objects, surfaces, signage, colors, edges, etc.) of the scene 620 that are within a threshold distance from the autonomous vehicle (e.g., elements closer to the vehicle than other elements in the scene 620), elements of the scene 620 that are approaching the vehicle (e.g., elements moving at a certain speed and/or located within a certain proximity to the vehicle), elements of the scene 620 that should be identified within a timeframe to navigate safely and/or to execute a driving maneuver and/or operation, elements of the scene 620 that are most relevant to a current (and/or imminent) context and/or operation of the vehicle, etc.

Figure 6B:
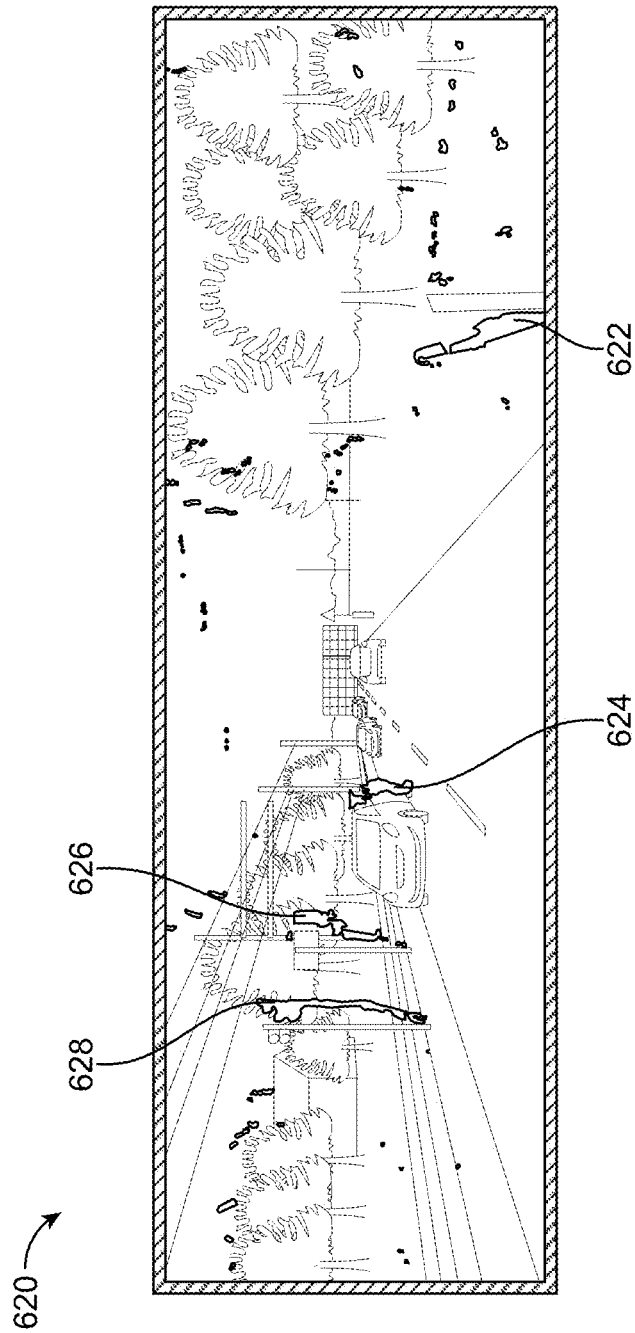
FIG. 6B illustrates example regions of attention identified by a vision cognition and memory algorithm, in accordance with some examples of the present disclosure.

FIG. 6B illustrates example regions of attention 622 through 628 identified by the vision cognition and memory algorithm 608. As shown, regions of the scene 620 that correspond to objects that are closer to the vehicle implementing the CV system 100 (and thus more relevant and/or currently relevant to the operation of the vehicle) are identified as the regions of attention 622 through 628, while other regions in the scene 620 corresponding to objects that are farther away from the vehicle (and thus less relevant at a current time) are not identified as regions of attention. In some examples, the neural network 606 can process the regions of attention 622 through 628 in a current input frame while skipping processing (e.g., refraining to process) other portions/regions of the current input frame.

Referring back to FIG. 6A, in some examples, the vision cognition and memory algorithm 608 can use the features 604 and any information from the neural network 606 to identify one or more regions of attention that should be processed by the neural network 606 for a current and/or future input frame. In some cases, the vision cognition and memory algorithm 608 can also generate one or more classification outputs (e.g., object classifications, scene classifications, etc.) and/or bounding boxes (and/or any other shapes) for one or more objects in the scene 620.

The vision cognition and memory algorithm 608 can send one or more portions of its output back to the neural network 606 for processing. For example, the vision cognition and memory algorithm 608 can send to the neural network 606 one or more regions of attention identified by the vision cognition and memory algorithm 608. The one or more regions of attention can inform the neural network 606 which portion(s) of the input frame should be processed by the neural network 606. The neural network 606 can perform object detection on the one or more regions of attention to detect and/or track any objects depicted in the one or more regions of attention. To increase efficiency, reduce the neural network processing workload, and/or reduce processing and/or system demands, the neural network 606 can skip processing any other region of the input frame that is not identified as a region of attention.

Figure 6C:
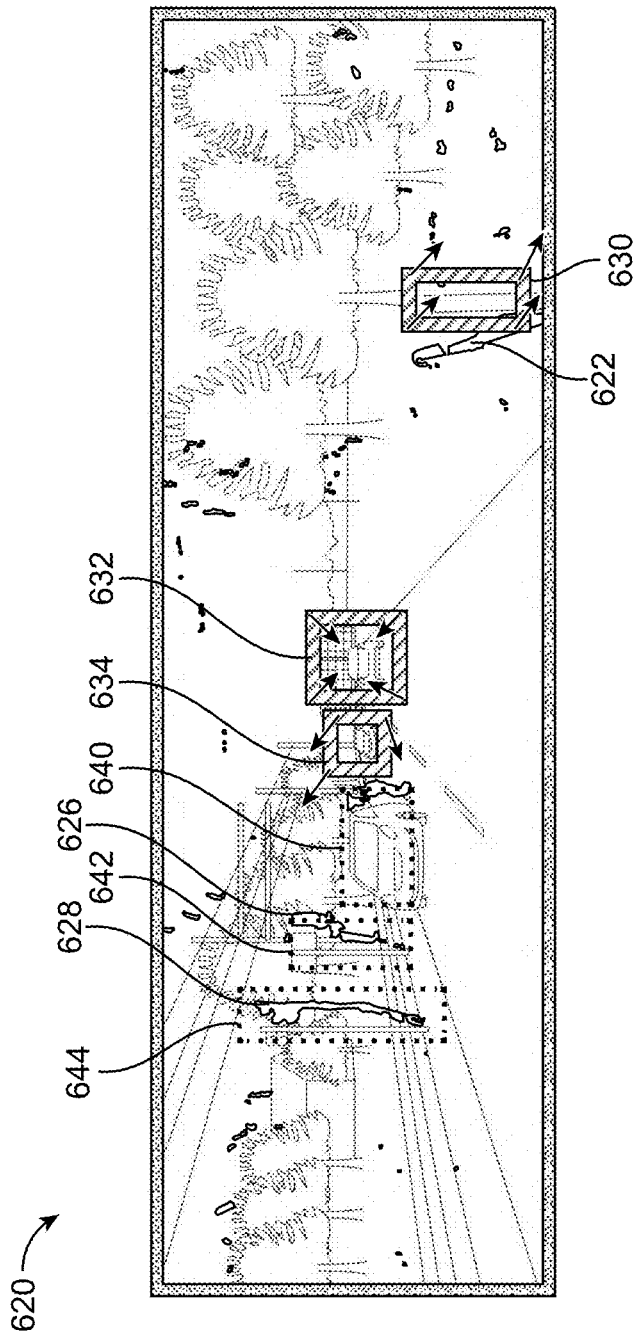
FIG. 6C illustrates example bounding boxes generated by a neural network for detected objects corresponding to regions of interest identified by a vision cognition and memory algorithm and processed by the neural network, in accordance with some examples of the present disclosure.

FIG. 6C illustrates bounding boxes 640, 642, and 644 generated by the neural network 606 for detected objects corresponding to the regions of interest 624, 626, and 628 identified by the vision cognition and memory algorithm 608 and processed by the neural network 606. FIG. 6C also illustrates bounding boxes 630, 632, and 634 for objects from a previous input frame. The objects from the previous input frame corresponding to the bounding boxes 630 through 634 can include objects estimated to be less relevant and/or important at a present time, such as objects estimated to be less relevant and/or important to a current operation of the vehicle associated with the CV system 100.

In some cases, the CV system 100 (e.g., via the neural network 606 and/or any other component of the CV system 100) can use optical flow estimates from previous and/or current frames to track objects in the scene 620. In some cases, the CV system 100 (e.g., via the neural network 606 and/or any other component of the CV system 100) can use optical flow estimates from the extracted features 604 to modify/update objects detected in a previous frame. For example, the CV system 100 can use optical flow estimates from a previous input frame to update/modify the objects corresponding to the bounding boxes 630 through 634. The CV system 100 can update/modify the objects from the previous input frame to reflect an estimated location/position, direction, and/or motion of the objects at the current frame and/or the time that the current frame was captured.

The neural network 606 can process the one or more regions of attention (e.g., regions of attention 622 through 628 shown in FIG. 6B) identified by the vision cognition and memory algorithm 608 for an input frame, and output the object detection results. In some examples, the neural network 606 can send the object detection results back to the vision cognition and memory algorithm 608. The vision cognition and memory algorithm 608 can use the object detection results from the neural network 606 and the features 604 to generate an output 610. The output 610 can include one or more classification results (e.g., object classifications, scene classifications, etc.) and/or one or more bounding boxes (and/or any other shapes) identifying the region(s) of the input frame corresponding to the detected object(s) from the scene 620. In some cases, the vision cognition and memory algorithm 608 can send the output 610 to the neural network 606, which the neural network 606 can use when processing an input frame and/or to modify a current and/or previous frame.

In some examples, the vision cognition and memory algorithm 608 can also send frame processing information to a switch 612 that controls the neural network processing rate for the neural network 606. For example, the vision cognition and memory algorithm 608 can use the features 604 and/or an output from the neural network 606 to determine a rate (e.g., a FPS rate or any other rate) for processing frames and/or regions of attention by the neural network 606. To illustrate, the vision cognition and memory algorithm 608 can determine that a region of attention corresponding to an approaching vehicle should be processed by the neural network 606 at a current time, and a different region of attention corresponding to a vehicle that is farther away (e.g., a region of attention that is not currently as relevant but is predicted to be relevant after a period of time and/or after n number of frames) should be processed by the neural network 606 after n number of frames have been captured and/or processed by the CV system 100.

For example, with reference to FIG. 6C, the vision cognition and memory algorithm 608 can determine that the regions of attention 622 through 628 should be processed by the neural network 606 in a current input frame, and the regions corresponding to the bounding boxes 630 through 634 should be processed by the neural network 606 in a next input frame or after processing n number of input frames.

Referring back to FIG. 6A, the switch 612 can use the information from the vision cognition and memory algorithm 608 (e.g., frame processing rate information, region of attention information, etc.) to determine which input frames should be sent to the neural network 606 for processing (and/or what region(s) of an input frame should be processed by the neural network 606), and which input frames should not be sent to the neural network 606 for processing (and/or what region(s) of an input frame should not be processed by the neural network 606). For example, if the information from the vision cognition and memory algorithm 608 indicates that every third input frame should be processed by the neural network 606, the switch 612 can send every third input frame to the neural network 606 and skip sending other input frames to the neural network 606.

As another example, if the information from the vision cognition and memory algorithm 608 indicates that the regions of attention 622 through 628 in a current input frame should be processed by the neural network 606 and the regions corresponding to the bounding boxes 630 through 634 shown in FIG. 6C should be processed after n frames, the switch 612 can send the regions of attention 622 through 628 in the current input frame to the neural network 606 for processing, and send the regions corresponding to the bounding boxes 630 through 634 shown in FIG. 6C to the neural network 606 after n frames. Alternatively, if the information from the vision cognition and memory algorithm 608 indicates that the regions of attention 622 through 628 in a current input frame should be processed by the neural network 606 and the regions corresponding to the bounding boxes 630 through 634 shown in FIG. 6C should be processed after n frames, the switch 612 can send to the neural network 606 instructions to process the regions of attention 622 through 628 in the current input frame and process the regions corresponding to the bounding boxes 630 through 634 shown in FIG. 6C after n frames.

Figure 7:
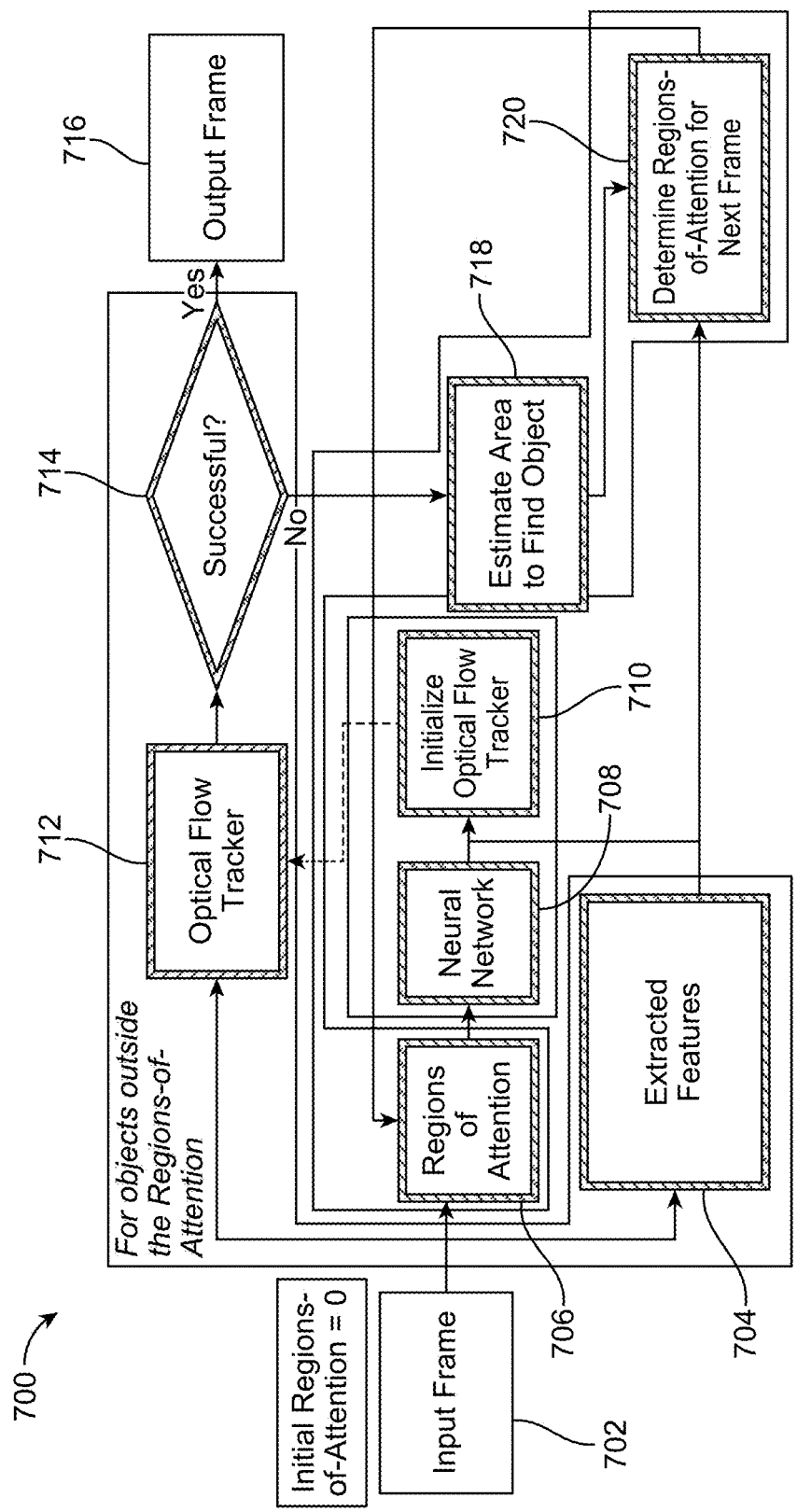
FIG. 7 is a flowchart illustrating an example flow for vision perception processing, in accordance with some examples of the present disclosure.

FIG. 7 is a flowchart illustrating an example flow 700 for vision perception processing, in accordance with some examples of the present disclosure. At the start of the flow 700, there are no initial regions of attention identified. The CV system 100 can extract features 704 from the input frame 702, as previously described. The extracted features 704 can include low level features such as, for example, an optical flow, a depth map, salient visual features, focus of expansion information, a segmentation map, sky detection information, color information, edge information, background features, foreground features, etc.

The CV system 100 can use the extracted features 704 to identify (e.g., via the vision cognition and memory algorithm 608) one or more regions of attention 706 for the input frame 702. The CV system 100 can identify the one or more regions of attention 706 as previously explained (see FIGS. 6A-6C). In some examples, the CV system 100 can also use the extracted features 704 to determine regions of attention 720 for a next input frame (e.g., a future input frame). The regions of attention 720 can be applied as further described below with respect to the regions of attention 706. In some cases, the CV system 100 can determine the regions of attention 720 based on the extracted features 704 and an area 718 estimated for finding one or more objects in the next frame.

A neural network 708 can apply the regions of attention 706 identified for the input frame 702. For example, the neural network 708 can process the regions of attention 706 in the input frame 702 and skip processing (e.g., refrain from processing) other portions of the input frame 702. In some examples, the neural network 708 can generate an object detection result from the processing of the regions of attention 706. In some examples, the neural network 708 can be the same as the neural network 210 shown in FIG. 2. In other examples, the neural network 708 can be any other type of neural network.

The CV system 100 can initialize 710 an optical flow tracker 712 to determine an optical flow (e.g., motion) for one or more objects in the input frame 702 that are outside of the regions of attention 706. In some examples, the neural network 708 can send to the optical flow tracker 712 an instruction to track an optical flow for objects that are outside of the regions of attention 706. In some cases, the neural network 708 can send one or more portions of its output (e.g., one or more object detection results, classifications, bounding boxes, and/or any other output) to the optical flow tracker 712 for use in determining the optical flow for the one or more objects that are outside of the regions of attention 706.

When initializing of the optical flow tracker 712, the optical flow tracker 712 can receive the extracted features 704 and the information from the neural network 708. The optical flow tracker 712 can use the extracted features 704 and the information from the neural network 708 to track an optical flow for one or more objects that are outside of the regions of attention 706. If the optical flow tracker 712 is successful (as determined at block 714) in tracking the optical flow for the one or more objects that are outside of the regions of attention 706, the CV system 100 can generate an output frame 716. In some examples, the output frame 716 can include an update to the one or more objects that are outside of the regions of attention 706. The update can reflect the motion of the one or more objects estimated by the optical flow tracker 712. In some examples, the output frame 716 can additionally or alternatively include classifications (e.g., object classifications, etc.) and/or bounding boxes (and/or any other shapes) corresponding to objects detected by the neural network 708.

If the optical flow tracker 712 is not successful (as determined at block 714) in tracking the optical flow for the one or more objects that are outside of the regions of attention 706, the CV system 100 can estimate an area 718 of the frame to find the one or more objects. As previously explained, the CV system 100 can use the area 718 and the extracted features 704 to determine the regions of attention 720 for the next frame.

The flow 700 can continue to use the optical flow tracker 712 to process subsequent frames (and/or portions of subsequent frames that are outside of determined regions of attention) to track objects that are outside of determined regions of attention, and can use the neural network 708 to process the regions of attention while skipping processing frame portions that are outside of the regions of attention.

Figure 8:
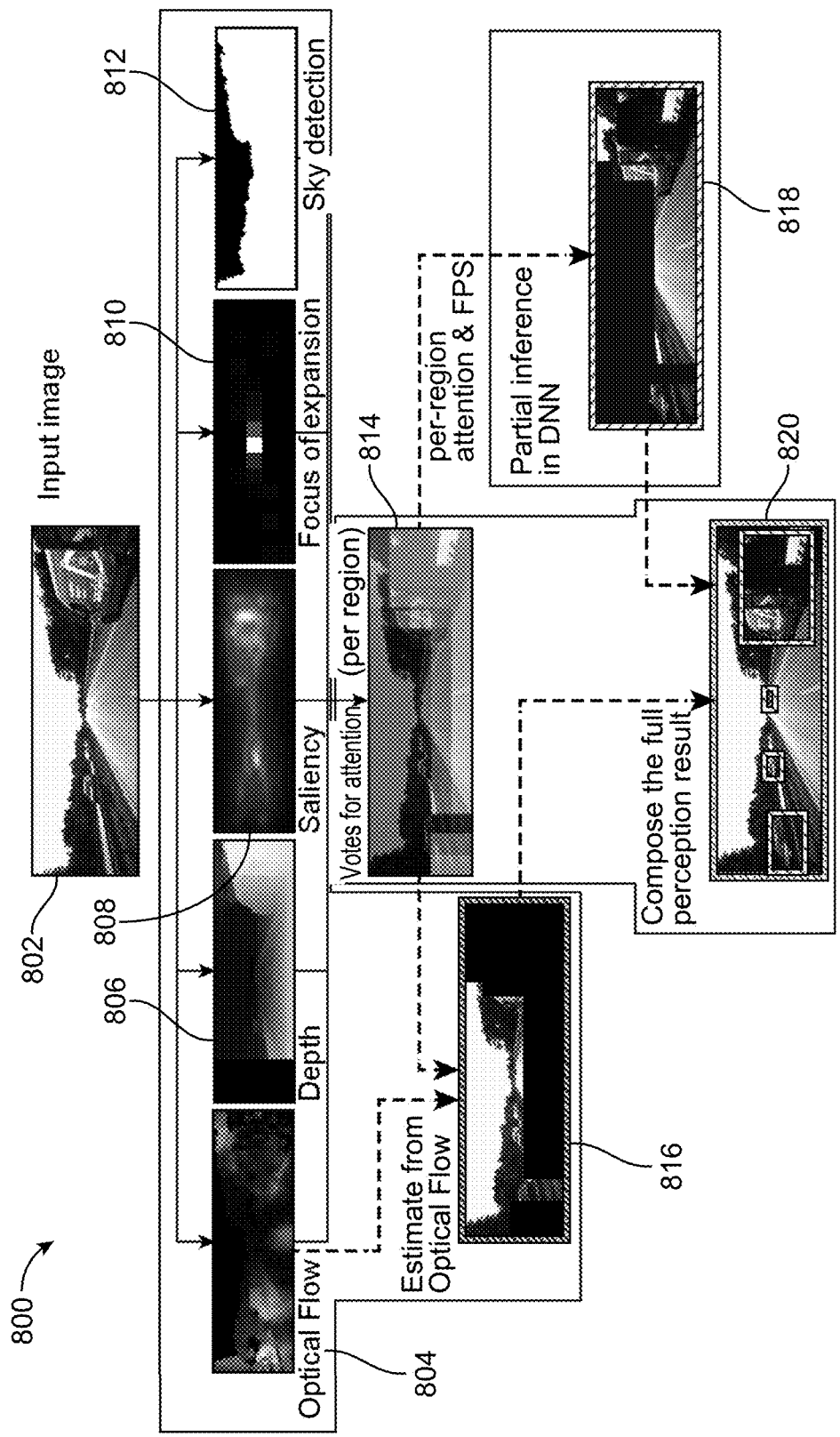
FIG. 8 is a diagram illustrating an example flow for sensing and understanding a scene using computer vision information, in accordance with some examples of the present disclosure.

FIG. 8 is a diagram illustrating an example flow 800 for sensing and understanding a scene using computer vision information such as low-level computer vision information. As shown, the CV system 100 extracts features 804 through 812 from an input image 802 of a scene. In some examples, the features 804 through 812 can include low-level features extracted from the input image 802 using one or more computer vision algorithms. The low-level features can include any low-level features such as, for example and without limitation, depth, optical flow, salient visual features, focus of expansion, sky detection, color detection, background and/or foreground features, edges, occlusions and/or disocclusions, and/or any other low-level features.

In the example shown in FIG. 8, the features 804 can include optical flow, the features 806 can include depth (e.g., a depth map), the features 808 can include salient visual features (e.g., graph-based visual saliency, features defining elements that distinguish one item/target from another, etc.), the features 810 can include focus of expansion, and the features 812 can include sky detection features. In other examples, the features extracted from the input image 802 can include any other features in addition to or instead of one or more of the features 804 through 812 shown in FIG. 8.

The CV system 100 can use the features 804 (e.g., optical flow) from the input image 802 and per region votes for attention 814 (described below) to generate updated frame regions 816. The updated frame regions 816 can include one or more regions that are outside of the regions of attention identified based on the per region votes for attention 814. The CV system 100 can use the features 804 (e.g., optical flow) to update frame regions to reflect and/or account for motion identified by the features 804.

The CV system 100 can use the features 804-812 to determine per region votes for attention 814 for the input image 802. In some examples, the CV system 100 can additionally or alternatively use other information to generate the updated frame regions 816 and/or determine the per region votes for attention 814. For example, in some cases, the CV system 100 can additionally or alternatively use an occlusion map, a disocclusion map, a driver attention estimate, a segmentation map, etc., to generate the updated frame regions 816 and/or determine the per region votes for attention 814.

The CV system 100 can use the per region votes for attention 814 to identify one or more regions of attention (e.g., one or more regions of interest, one or more regions of importance and/or relevance, etc.) in the input image 802, as further described herein. The CV system 100 can use the one or more regions of attention to determine what portion(s) of the input image 802 should be processed by a neural network (e.g., for object detection) and what portion(s) of the input image 802 should be processed by an optical flow tracker (e.g., optical flow tracker 712). For example, the CV system 100 can use a neural network to process the one or more regions of attention determined for the input image 802 based on the per region votes for attention 814, and can use an optical flow tracker to process regions that are outside of the one or more regions of attention in order to track an optical flow (and/or modify/update based on an estimated optical flow) associated with those regions that are outside of the one or more regions of attention.

In some examples, the CV system 100 can determine an attention demand score per region of the input image 802 based on one or more computer vision processing results (e.g., optical flow, depth, visual saliency, focus of expansion, sky detection, etc.). The CV system 100 can use the attention demand score per region to determine attention votes (e.g., attention demands or attention requests) per region from the one or more computer vision functions associated with the one or more computer vision processing results. In some examples, the CV system 100 can then use the attention votes per region to determine an attention score per region. In some cases, the CV system 100 can also determine a neural network processing rate (e.g., a FPS rate) to implement for processing regions of attention using a neural network.

The CV system 100 can use the per region votes for attention 814 (and/or per region attention demand scores) to identify one or more regions of attention in the input image 802. The CV system 100 can selectively process the one or more regions of attention using a neural network. To increase efficiency and reduce processing loads/burdens while maintaining accuracy, the CV system 100 can process the one or more regions of attention using a neural network and skip processing (e.g., refrain from processing) other regions of the input image 802 (e.g., regions outside of the one or more regions of attention) using the neural network. In some cases, the CV system 100 can instead use an optical flow tracker to process any regions that are outside of the one or more regions of attention.

In some examples, the CV system 100 can process regions of the input image 802 (e.g., each of the one or more regions of attention) at respective rates (e.g., respective FPS rates) determined based on the per region votes for attention 814. For example, the neural network of the CV system 100 can process a region of attention having a higher attention score (and/or a higher number of votes for attention) at a higher rate than a region of attention having a lower attention score (and/or a lower number of votes for attention).

The neural network of the CV system 100 can process the one or more regions of attention to generate a partial inference 818 for the input image 802. The partial inference 818 can include one or more inferences determined for a portion of the image (e.g., the one or more regions of attention) that is smaller/less than the entire input image 802. For example, the partial inference 818 can include a respective object detection result for each region of attention determined for the input image 802. As previously mentioned, the neural network can each of the one or more regions of attention at a respective rate (e.g., an FPS rate). In some cases, the respective rate can be the same for each region of attention. In other cases, the respective rate of a region of attention can be different than the respective rate of another region(s) of attention.

The CV system 100 can generate a perception result 820 based on the updated frame regions 816 and the partial inference 818 from the neural network. The perception result 820 can include an object detection result for the entire input image 802. In some examples, the CV system 100 can generate the object detection result (e.g., the perception result 820) for the full input image 802 by merging an object detection result (e.g., the partial inference 818) from the neural network processing on partial regions (e.g., the one or more regions of attention) of the input image 802 for the regions of attention with an adjustment (e.g., update, modification) of a previous object detection result based on the optical flow (e.g., features 804) determined for one or more regions of the input image 802 that are outside of the one or more regions of attention.

Figure 9:
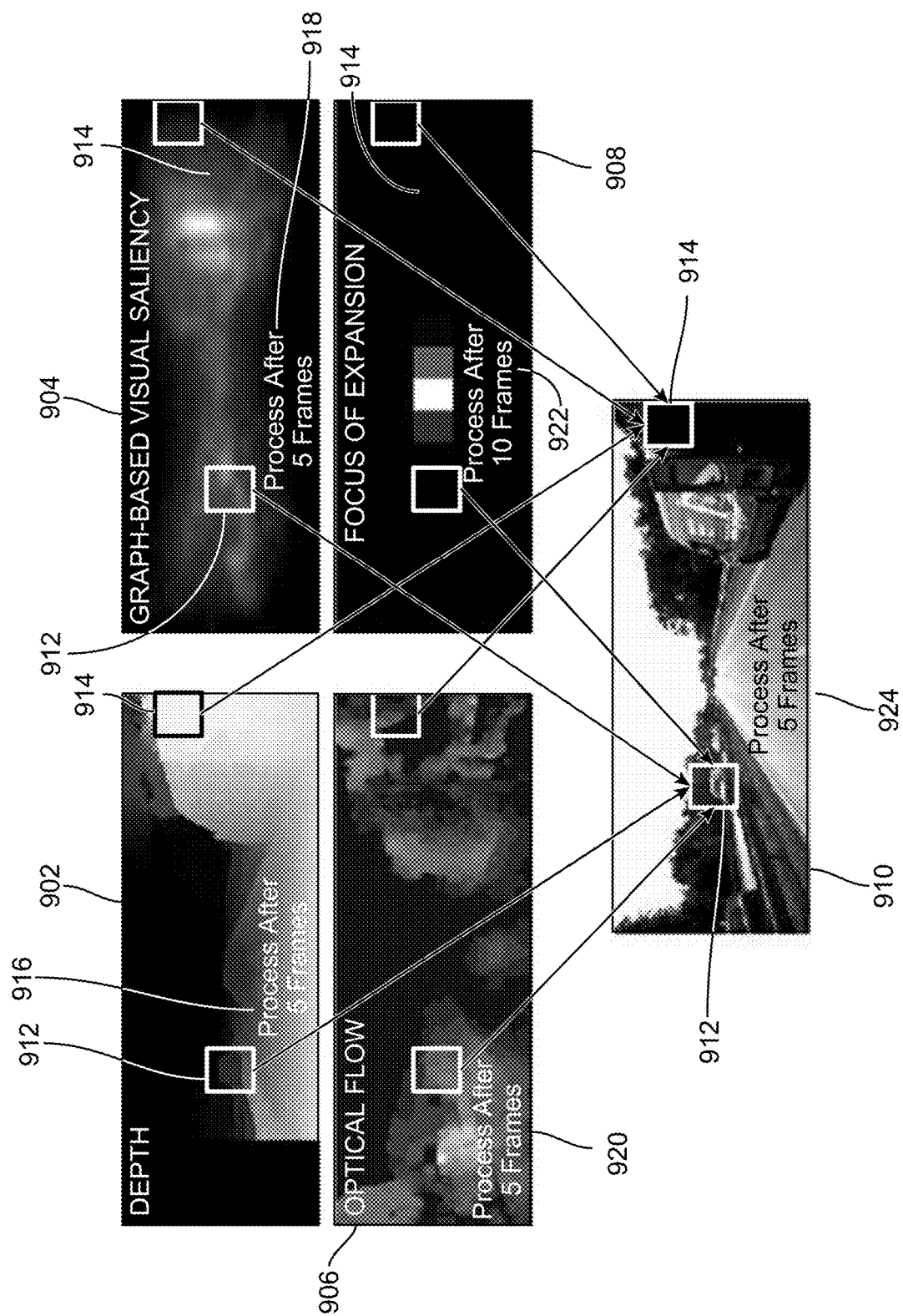
FIG. 9 is a diagram illustrating an example processing of features extracted from an image of a scene to determine per region votes for attention and regions of attention, in accordance with some examples of the present disclosure.

FIG. 9 is a diagram illustrating an example processing of features extracted from an image 910 of a scene to determine per region votes for attention and regions of attention. In this example, the extracted features include a depth map 902, graph-based visual saliency estimate 904, optical flow estimate 906, and a focus of expansion estimate 908.

The CV system 100 can generate votes of attention for image regions 912 and 914. The image regions 912 and 914 can include grid regions and/or any other type of regions. In some examples, the CV system 100 can obtain the votes of attention for the image regions 912 and 914 from respective computer vision functions used to determine the extracted features (e.g., the depth map 902, the graph-based visual saliency estimate 904, the optical flow estimate 906, and the focus of expansion estimate 908).

For example, the CV system 100 can obtain (e.g., from a depth estimation function used to determine the depth map 902) respective votes of attention for the image regions 912 and 914 in the depth map 902. The CV system 100 can obtain (e.g., from a visual saliency estimation function used to determine the graph-based visual saliency estimate 904) respective votes of attention for the image regions 912 and 914 in the graph-based visual saliency estimate 904. The CV system 100 can obtain (e.g., from an optical flow tracker used to determine the optical flow estimate 906) respective votes of attention for the image regions 912 and 914 in the optical flow estimate 906. Moreover, the CV system 100 can obtain (e.g., from a focus of expansion function used to determine the focus of expansion estimate 908) respective votes of attention for the image regions 912 and 914 in the focus of expansion estimate 908.

The CV system 100 can process the image regions 912 and 914 of the image 910 at respective rates (which can be the same or can vary) determined based on the respective votes of attention obtained from respective computer vision functions (e.g., depth estimation function, visual saliency estimation function, optical flow tracker, focus of expansion function, etc.) for the image regions 912 and 914. For example, a depth estimation function can determine a recommended rate 916 for processing the image region 912 from the depth map 902, a visual saliency estimation function can determine a recommended rate 918 for processing the image region 912 from the graph-based visual saliency estimate 904, the optical flow tracker can determine a recommended rate 920 for processing the image region 912 from the optical flow estimate 906, and a focus of expansion function can determine a recommended rate 922 for processing the image region 912 from the focus of expansion estimate 908. The CV system 100 can then determine the processing rate for the image region 912 based on the recommended rates obtained from the computer vision functions (e.g., the functions that generated the depth map 902, the graph-based visual saliency estimate 904, the optical flow estimate 906, and the focus of expansion estimate 908) for the image region 912, and the processing rate for the image region 914 based on the recommended rates obtained from the computer vision functions (e.g., the functions that generated the depth map 902, the graph-based visual saliency estimate 904, the optical flow estimate 906, and the focus of expansion estimate 908) for the image region 914.

To illustrate, in the example shown in FIG. 9, the recommended rate 916 obtained from the depth estimation function for the image region 912 indicates that the image region 912 should be processed (e.g., by a neural network) after every n number of frames, the recommended rate 918 obtained from the visual saliency estimation function for the image region 912 indicates that the image region 912 should be processed (e.g., by a neural network) after every n number of frames, the recommended rate 920 obtained from the optical flow tracker for the image region 912 indicates that the image region 912 should be processed (e.g., by a neural network) after every n number of frames, and the recommended rate 922 obtained from the focus of expansion estimation function for the image region 912 indicates that the image region 912 should be processed (e.g., by a neural network) after every m number of frames.

The CV system 100 can use the recommended rates 916, 918, 920, and 922 obtained from the computer vision functions for the image region 912 to determine the processing rate 924 for the image region 912. In the example shown in FIG. 9, the processing rate 924 for the image region 912 of the image 910 indicates that the image region 912 should be processed after n number of frames. As shown, the processing rate 924 is based on the recommended rates 916, 918, 920, and 922. Similarly, the CV system 100 can determine the processing rate for the image region 914 based on the recommended rates obtained from the computer vision functions (e.g., the functions that generated the depth map 902, the graph-based visual saliency estimate 904, the optical flow estimate 906, and the focus of expansion estimate 908 for the image region 914.

In some examples, the CV system 100 can process image regions (e.g., image region 912, image region 914) and/or features (e.g., depth, visual saliency, optical flow, focus expansion, etc.), after every same number of frames or after a different number of frames for two or more of the image regions and/or features (e.g., depth, visual saliency, optical flow, focus expansion, etc.). In some examples, the processing rate determined for regions and/or features in the image 910 can indicate that the neural network processing should skip one or more frames for certain processing regions and/or features, which can allow the CV system 100 to increase a processing efficiency and reduce the overall compute load, power consumption, heat, etc., of the CV system 100.

Figure 10:
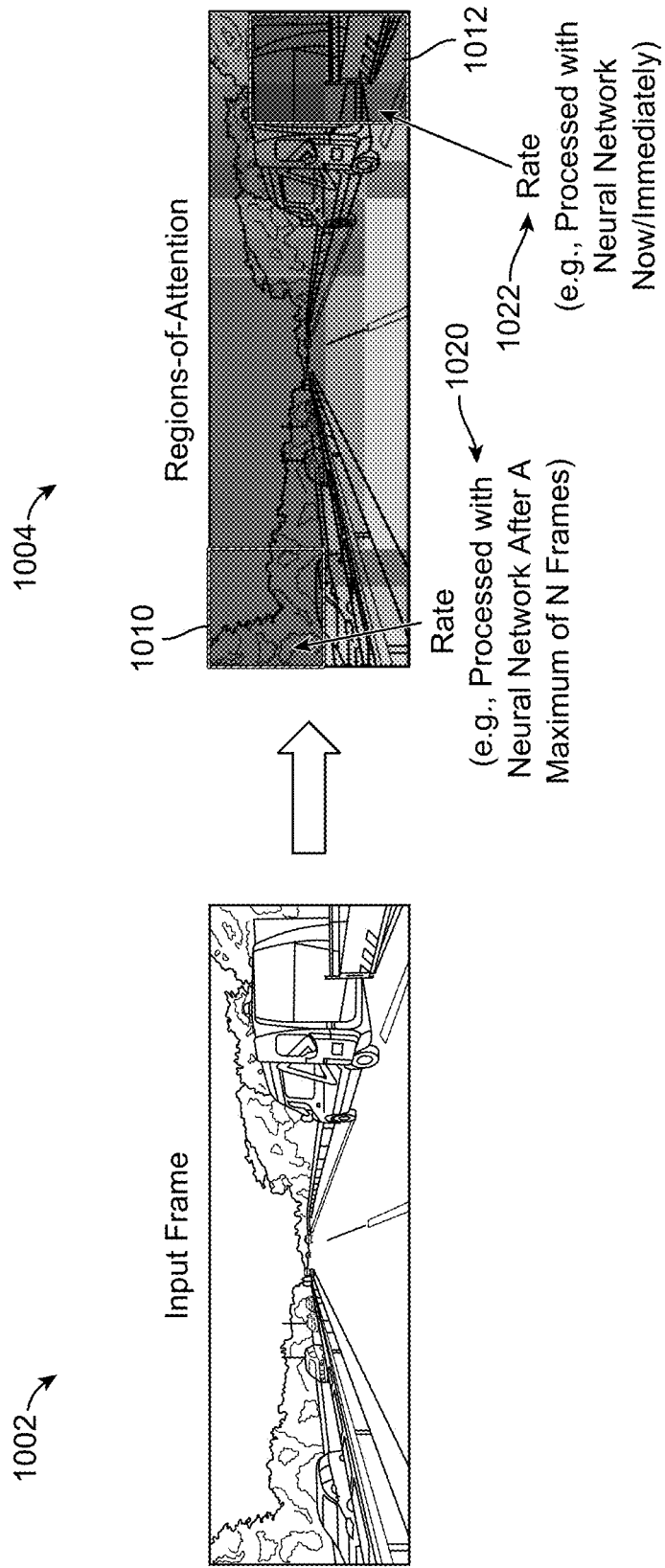
FIG. 10 is a diagram illustrating an example processing of regions of attention in an input frame according to respective processing rates determined for the regions of attention, in accordance with some examples of the present disclosure.

FIG. 10 is a diagram illustrating an example processing of regions of attention 1010 and 1012 in an input frame 1002 according to respective processing rates 1020 and 1022 determined for the regions of attention 1010 and 1012. As shown in FIG. 10, the CV system 100 processes the input frame 1002 to identify regions of attention 1004 and rates 1020 and 1022 for processing the regions of attention 1004 in the frame. In this example, the regions of attention 1004 include region of attention 1010 and region of attention 1012.

The CV system 100 can determine the regions of attention 1010 and 1012 for the based on votes for attention obtained for the regions of attention 1010 and 1012 from computer vision functions used to extract features from the input frame 1002. The computer vision functions can include, for example and without limitation, a depth estimation function, a visual saliency estimation function, an optical flow tracker, a focus of expansion function, a semantic segmentation function, a disparity map estimation function, a sky detection function, an edge detection function, a color detection function, and/or any other computer vision function.

In the illustrative example shown in FIG. 10, the rate 1020 indicates that region of attention 1010 should be processed by a neural network of the CV system 100 after a maximum of n number of frames have been processed and/or captured, and the rate 1022 indicates that region of attention 1012 should be processed now by the neural network. Based on the regions of attention 1004 and the rates 1020 and 1022 identified, the neural network can skip processing one or more regions (e.g., one or more regions that are outside of the regions of attention 1010 and 1012) and/or one or more frames to increase a processing efficiency and reduce an overall compute load, power consumption, heat, etc., of the CV system 100.

Figure 11:
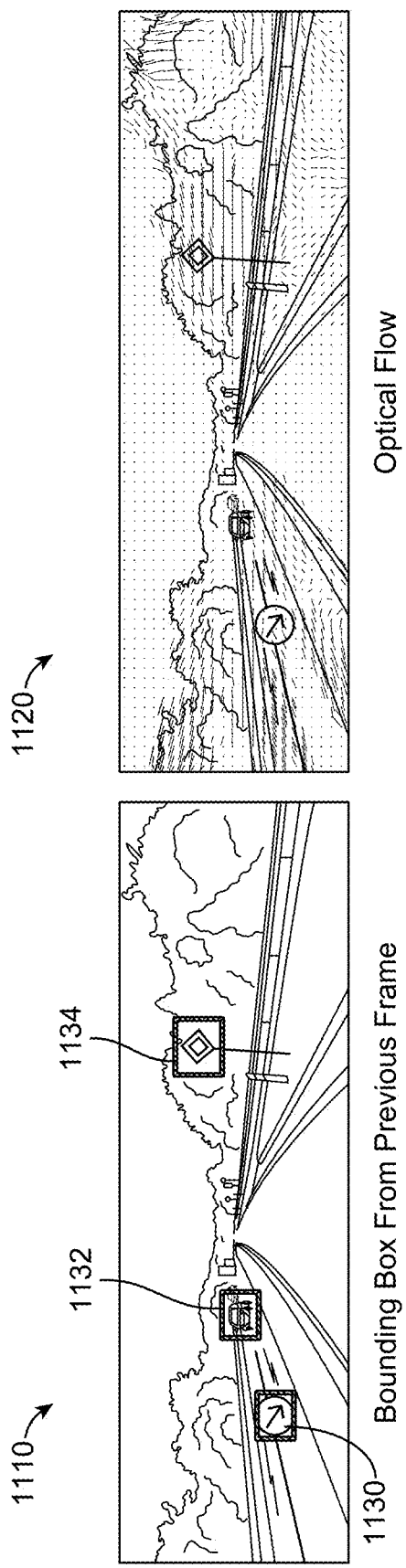
FIG. 11 is a diagram illustrating a frame depicting bounding boxes generated from a previous frame and a frame depicting an optical flow estimated by an optical flow tracker, in accordance with some examples of the present disclosure.

FIG. 11 is a diagram illustrating a frame 1110 depicting bounding boxes 1130-1134 generated from a previous frame and a frame 1120 depicting an optical flow estimated by an optical flow tracker of the CV system 100. The bounding boxes 1130-1134 can identify respective frame regions that include scene elements (e.g., objects, scene features such as a sky, etc.) within the respective frame regions. The bounding boxes 1130-1134 can include, surround, identify, and/or encompass the scene elements in the respective frame regions.

The optical flow tracker can use the bounding boxes 1130, 1132, and 1134 generated from the previous frame (e.g., the bounding boxes depicted in the frame 1110) and the estimated optical flow (e.g., the optical flow depicted in frame 1120) to update the bounding boxes 1130-1134 generated from the previous frame 1110 to account for the estimated motion of the scene elements. The updated bounding boxes can track a movement of the scene elements between frames. For example, the optical flow can reflect movement of the scene elements within the scene (and/or an image of the scene). The optical flow tracker can use the bounding boxes 1130-1134 generated from the previous frame and the estimated optical flow to update a placement (e.g., a location, etc.) of the bounding boxes 1130-1134 to include, surround, and/or encompass the scene elements after the movement of the scene elements (e.g., after a change in the location of the scene elements).

In some examples, the optical flow tracker can use a respective optical flow direction from the optical flow (e.g., the optical flow depicted in frame 1120) to determine where to move each of the bounding boxes 1130-1134. The optical flow tracker can also use an optical flow magnitude to determine a distance to move the bounding boxes 1130-1134. In some cases, the CV system 100 can use feature matching to ensure that the bounding boxes 1130-1134 from the previous frame and the updated bounding boxes (e.g., the bounding boxes modified to reflect movement of the scene elements identified by the estimated optical flow) contain the same scene elements (e.g., the same objects, etc.). In some examples, the CV system 100 can use scale-invariant feature transform (SIFT) feature matching to verify that the bounding boxes 1130-1134 from the previous frame and the updated bounding boxes contain the same scene elements.

Figure 12:
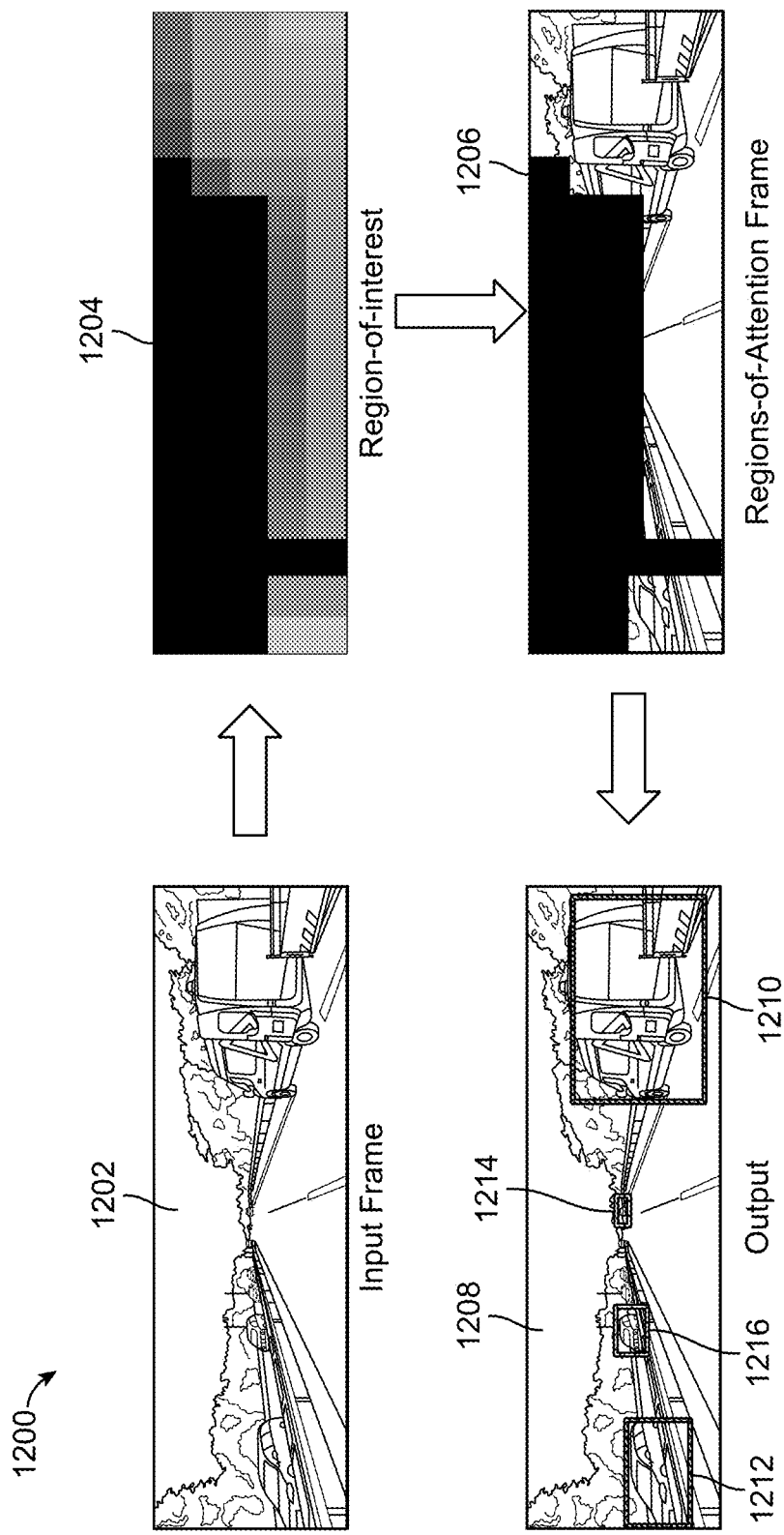
FIG. 12 is a diagram illustrating an example of a partial neural network inference flow, in accordance with some examples of the present disclosure.

FIG. 12 is a diagram illustrating an example of a partial neural network inference flow 1200. In some examples, the partial neural network inference is only performed for regions of attention in an input frame 1202. In the example partial neural network inference flow 1200, the CV system 100 processes the input frame 1202 to identify regions of attention.

The CV system 100 can generate a mask 1204 (or map) identifying regions of attention determined for the input frame 1202. The CV system 100 can use the mask 1204 identifying the regions of attention to generate a regions of attention frame 1206. The CV system 100 can then use the regions of attention frame 1206 to generate an output frame 1208.

The output frame 1208 in this example includes bounding boxes 1210 and 1212 showing and/or including objects tracked using a neural network of the CV system 100, and bounding boxes 1214 and 1216 showing and/or including objects tracked by an optical flow tracker using optical flow. As shown in the partial neural network inference flow 1200, the CV system 100 can use a neural network to track certain objects in a scene, and an optical flow tracker to track other objects in the scene. The objects tracked using the neural network can correspond to regions of attention determined for the frame of the scene as previously explained. In some examples, the objects tracked using the neural network can include objects in the scene that are most important and/or relevant (e.g., closer objects, objects approaching faster, etc.) at a current time and/or context, and the objects tracked using the optical flow tracker can include objects that are less important and/or relevant at the current time and/or context.

The optical flow tracker can be more efficient and less demanding than the neural network, and the neural network can be more demanding and less efficient than the optical flow tracker but more accurate than the optical flow tracker. The CV system 100 can use the more efficient and less demanding optical flow tracker to track objects that are less important and/or relevant at a present time, context, and/or frame; and the more demanding but more accurate neural network to track objects that are more important and/or relevant at the present time, context, and/or frame. This way, the CV system 100 can increase overall efficiency and reduce overall computational load and resource consumption, while maintaining an accuracy in the tracking results.

Figure 13:
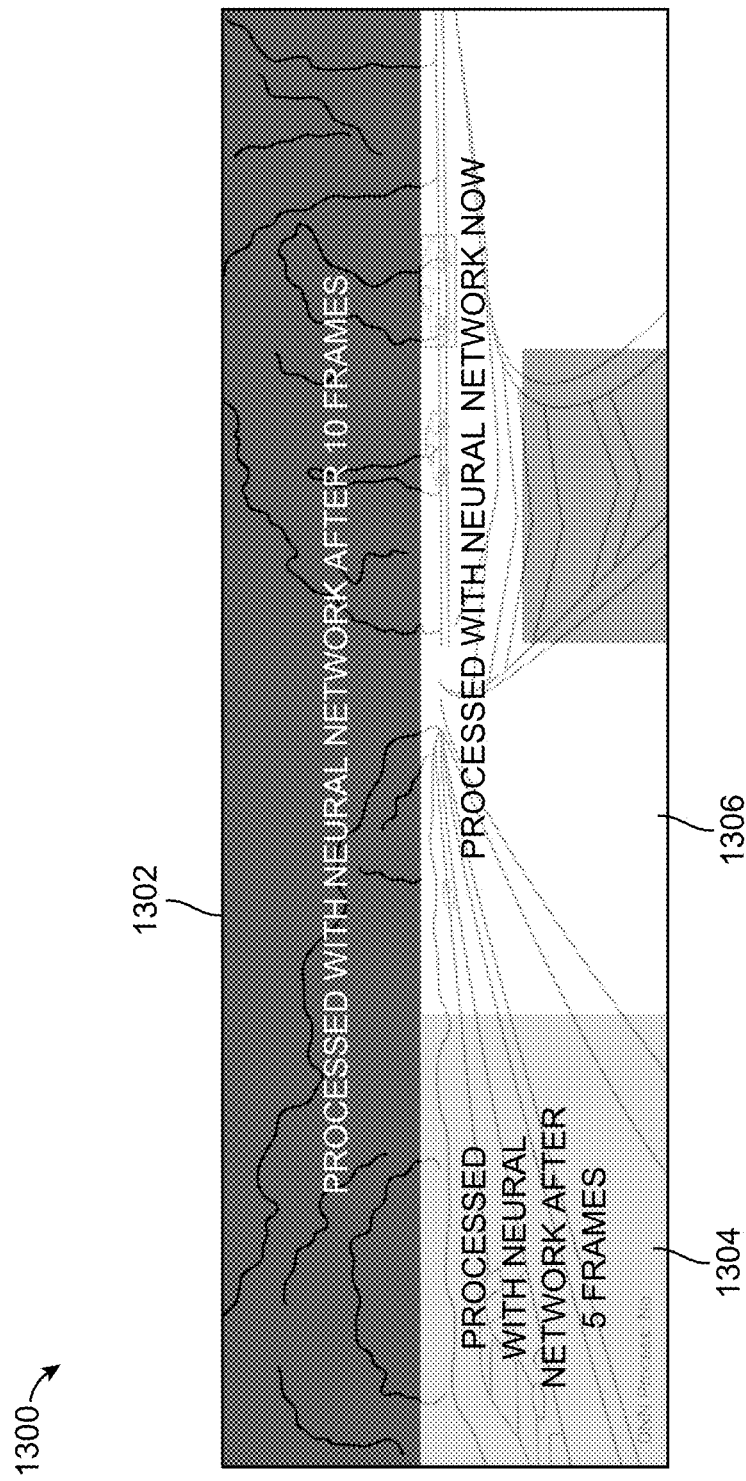
FIG. 13 is a diagram illustrating an example selective processing of frame regions by a neural network, in accordance with some examples of the present disclosure.

FIG. 13 is a diagram illustrating an example selective processing of frame regions by a neural network. In this example, an example frame 1300 identifies (and/or is partitioned into) regions 1302-1306. The regions 1302-1306 are selectively processed at respective rates determined by the CV system 100 as previously described.

As shown, the region 1302 of the frame 1300 is configured and/or selected for processing by the neural network after n number of frames are processed and/or captured. The region 1304 is configured and/or selected for processing by the neural network after m number of frames are processed and/or captured. The n number of frames and the m number of frames can represent the same or different values. The region 1306 is configured and/or selected for processing by the neural network at a current time. Thus, the neural network can process the region 1306 at a current time, but can skip processing the region 1302 for a certain number of frames (e.g., based on the n number of frames rate) and the region 1304 for a certain number of frames (e.g., based on the m number of frames rate).

In some examples, the neural network only processes regions determined to be important and/or relevant at certain times. As previously explained, low-level computer vision can be used to sense and/or understand the scene depicted by the frame 1300. The low-level computer vision can include, for example and without limitation, depth estimation, optical flow, occlusion/disocclusion estimation, sky detection, salient visual feature estimation, etc. The CV system 100 can identify the regions to be processed by the neural network (e.g., the more relevant and/or important regions), and combine features (e.g., low level features such as depth, visual saliency, occlusions and/or disocclusions, optical flow, scene elements such as a sky, etc.) extracted from the frame 1300 to understand the scene depicted by the frame. As previously explained, in some examples, the CV system 100 can perform a neural network inference only on important and/or relevant regions of the frame 1300. This can improve overall performance (e.g., frames-per-second), efficiency, power consumption, etc., of the CV system 100.

In an example autonomous driving use case, the selective processing can improve ADAS perception by ensuring that neural networks only process the important and/or relevant regions of a frame of a scene, so that the more expensive/demanding neural network processing is not used or wasted on less important and/or relevant parts of the frame. The CV system 100 can use low-level computer vision algorithms to sense and understand the scene. Non-limiting examples of low-level computer vision algorithms include algorithms for depth estimation, optical flow, sky detection, occlusion and/or disocclusion detection, visual saliency, etc. The CV system 100 can combine the information from the low-level computer vision algorithms to determine what areas of the scene are most important and/or relevant in order to limit the neural network processing to those areas. Moreover, the CV system 100 can combine the information from the low-level computer vision algorithms to determine which areas (e.g., the more important and/or relevant areas) should be processed by the neural network immediately. The neural network can then perform a neural network inference (e.g., object detection) the areas identified.

Figure 14:
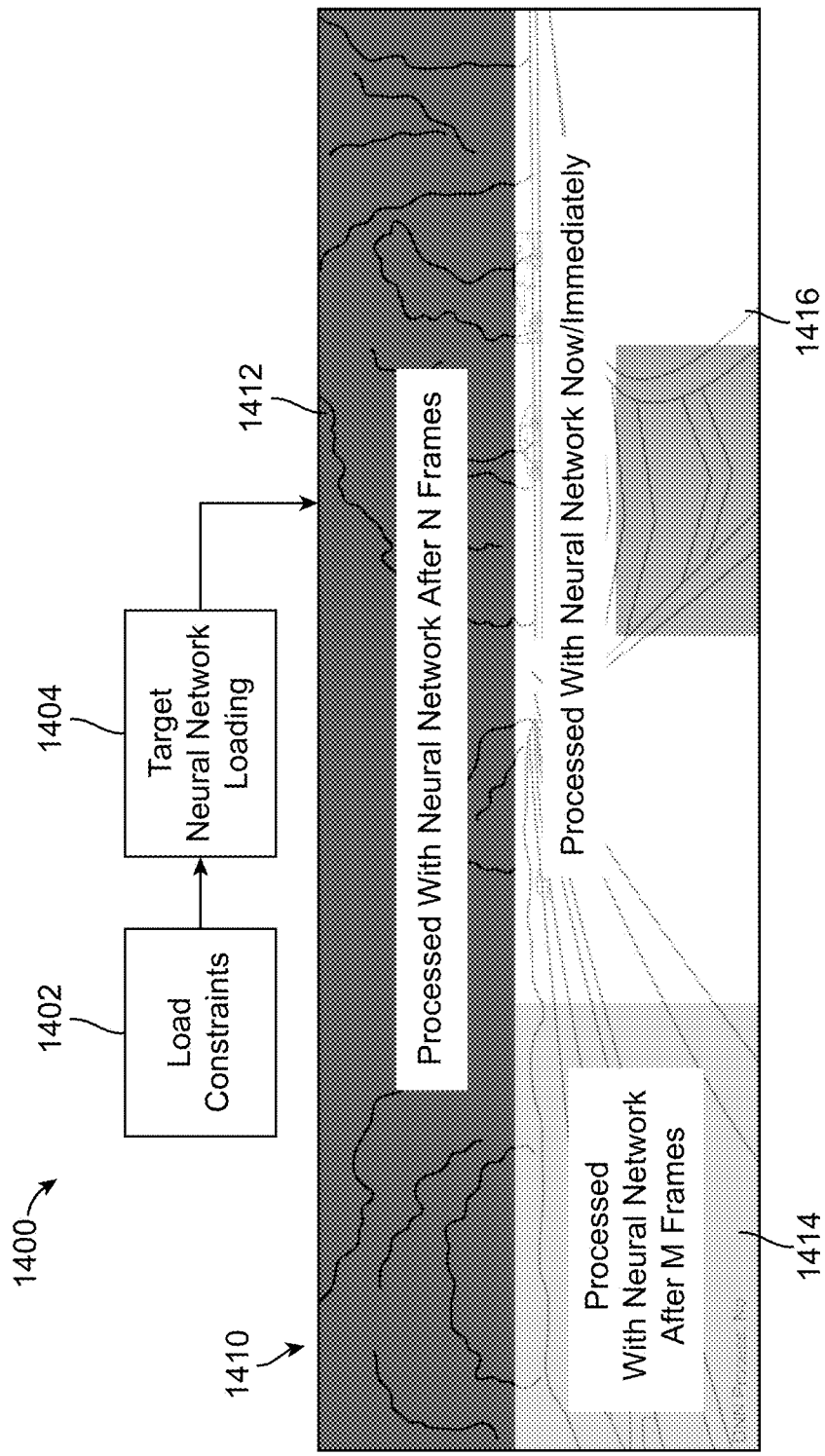
FIG. 14 is a diagram illustrating an example load control flow for dynamically balancing neural network loads, in accordance with some examples of the present disclosure.

FIG. 14 is a diagram illustrating an example load control flow 1400 for dynamically balancing neural network loading. The load control flow 1400 can dynamically balance neural network loading based on load constraints 1402 of the CV system 100. In some examples, the load constraints 1402 can include a thermal power envelope (e.g., power constraint, temperature constraint, etc.) of the CV system 100. In some cases, the load constraints 1402 can additionally or alternatively include a system performance, resource availability, processing requirements, performance requirements, and/or any other hardware, processing, and/or software constraints.

The CV system 100 can use the load constraints 1402 to determine a target neural network load 1404. The target neural network load 1404 can dynamically balance the loading of the neural network of the CV system 100 according to the load constraints 1402. In some examples, the target neural network load 1404 can define one or more loads and/or one or more processing rates (e.g., one or more FPS rates) for processing frames and/or frame regions by the neural network of the CV system 100. For example, in the illustrative example of FIG. 14, the target neural network load 1404 provides that frame region 1412 of frame 1410 is to be processed using the neural network after n number of frames have been processed and/or captured, frame region 1414 is to be processed using the neural network after m number of frames have been processed and/or captured, and frame region 1416 is to be processed using the neural network immediately. In some examples, the number of frame regions and the processing rates (e.g., FPS rates) can be determined based on dynamically changing constraints for computing load capability to ensure the total processor load meets the load constraints 1402.

The target neural network load 1404 can allow the CV system 100 to reduce the load on the system from neural network processing. In general, object detection and tracking using neural networks is more accurate and reliable than the objecting tracking using optical flow, while the processing load and power consumption of optical flow calculations are smaller than that of neural networks. Accordingly, the dynamic balancing of neural network loading can balance accuracy, reliability, processing load, and power consumption.

Figure 15:
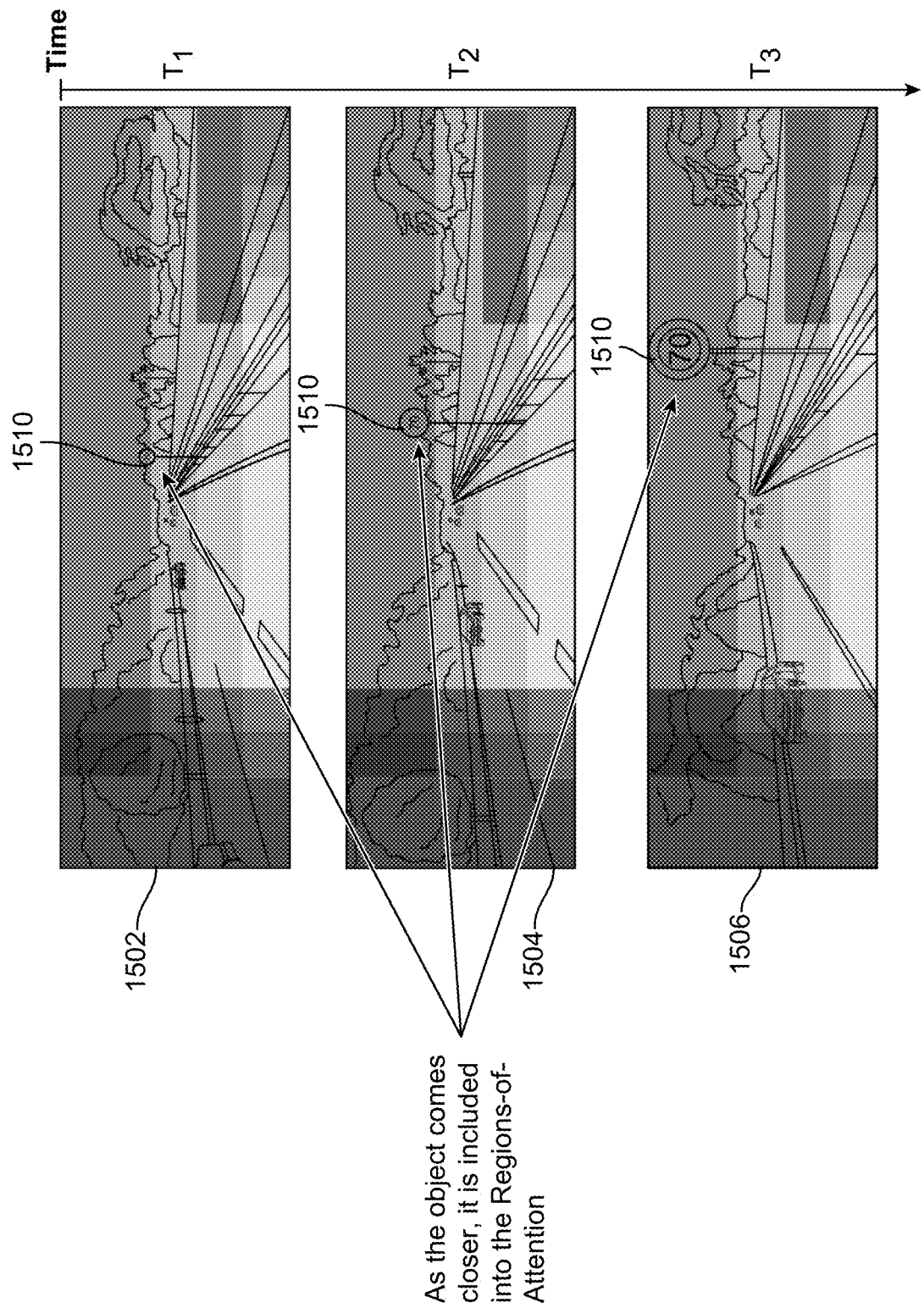
FIG. 15 is a diagram illustrating an example of adaptive regions of attention determined for varying portions of frames of a scene processed by a system, in accordance with some examples of the present disclosure.

FIG. 15 is a diagram illustrating an example of adaptive regions of attention determined for varying portions of frames of a scene processed by the CV system 100. In this example, the frames 1502-1506 depict a driving scene. Frame 1502 was captured at time $t_1$, frame 1504 was captured at time $t_2$, and frame 1506 was captured at time $t_3$. Thus, frame 1502 depicts the driving scene at a first time, frame 1504 depicts the driving scene at a second time after the first time, and frame 1506 depicts the driving scene at a third time after the second time.

As shown, frame 1502 depicts an object 1510 at a distance (e.g., relative to an image capture device of the CV system 100 used to capture the frames 1502-1506), frame 1504 depicts the object 1510 at a closer distance, and frame 1506 depicts the object 1510 at an even closer distance. In implementing adaptive regions of attention, the CV system 100 can exclude the frame region depicting the object 1510 from the regions of attention when the object 1510 is farther away from the CV system 100 (e.g., and thus less immediately relevant and/or important), and include the frame region depicting the object 1510 in the regions of attention when the object 1510 is closer to the CV system 100 (e.g., and thus more immediately relevant and/or important).

For example, the CV system 100 can exclude the frame region depicting the object 1510 from the region(s) of attention determined for frame 1502, as the object 1510 is farther away in frame 1502 than in frame 1504 and frame 1506. The CV system 100 can include the frame region depicting the object 1510 from the region(s) of attention determined for frame 1506, as the object 1510 is closest in frame 1506 (e.g., than in frame 1502 and frame 1504). In some examples, the CV system 100 may include the frame region depicting the object 1510 from the region(s) of attention determined for frame 1504, as the object 1510 is closer in frame 1504 than in frame 1502 but farther in frame 1504 than in frame 1506. In other examples, the CV system 100 may exclude the frame region depicting the object 1510 from the region(s) of attention determined for frame 1504.

Thus, as the object 1510 comes closer in the frame, the CV system 100 can include the frame region depicting the object 1510 in the regions of attention identified for processing by a neural network of the CV system 100, and when the object 1510 is farther away, the CV system 100 can exclude the frame region depicting the object 1510 from the regions of attention identified for processing by the neural network. As such, when the object 1510 is closer to the CV system 100 and thus more immediately relevant and/or important, the CV system 100 can include the region around the object 1510 in the regions of attention to be processed by the neural network.

In some cases, the CV system 100 can use one or more loading or load balancing factors (e.g., load constraints 1402 shown in FIG. 14) to determine whether the frame region depicting the object 1510 should be included or excluded from the region(s) of attention determined for frame 1504. In some cases, the CV system 100 can additionally or alternatively implement a threshold for determining whether the frame region depicting the object 1510 should be included or excluded from the region(s) of attention determined for a frame. For example, the CV system 100 can determine if a particular threshold(s) is met, and determine to include the frame region depicting the object 1510 in the region(s) of attention for frame 1504 if the threshold(s) is met, and excluded it from the region(s) of attention for frame 1504 if the threshold is not met. The threshold can include, for example and without limitation, a threshold distance of the object (e.g., relative to the CV system 100), a threshold velocity of the object, a threshold period of time until the object is predicted to come within a proximity of the CV system 100, a threshold performance, a threshold accuracy, a threshold system load, and/or any other factor and/or combination of factors.

As previously explained, the CV system 100 can implement per-region processing rates (e.g., FPS rates), thresholds or criteria to determine the amount of regions of attention to include for processing by a neural network of the CV system 100, target neural network loading (e.g., target neural network load 1404), elemental attention factors, object tracking, etc. In some examples, the per-region processing rates (e.g., per-region FPS rates) can apply different rates (e.g., different FPS rates) of neural network processing depending on the regions of attention (e.g., higher processing rates for regions having a higher attention score) in one or more frames of a scene. These object detection and adaptive processing techniques can increase the processing efficiency while reducing overall power consumption and temperature conditions and providing accurate results. In autonomous driving use cases, the object detection and adaptive processing techniques can also increase and/or ensure an autonomous driving safety. For example, the object detection and adaptive processing techniques can ensure that no object in a scene is missed in the object detection and/or tracking results, and can enable scheduling of per-region processing based on priorities (e.g., attention votes).

In some examples, thresholds and/or criteria as described herein can provide dynamic feedback control according to one or more factors such as, for example and without limitation, a performance, power consumption, temperature conditions, thermal budget changes in hardware systems/components, a accuracy requirements, resource availability, processing constraints, service requirements and/or expectations, system capabilities, and/or any other factors. In some cases, the number of regions selected for processing by the neural network and/or the neural network processing rates (e.g., FPS rates) can be determined based on dynamically changing constraints for computing a load capability, in order to ensure the total processor load meets the constraints.

In general, object detection and tracking from neural networks is more accurate and reliable than tracking using an optical flow tracker, while the processing load and power consumption of the optical flow tracker is smaller than that of neural networks. The differences between neural network processing and optical flow calculation in terms of accuracy, reliability, performance, power consumption, processing complexity, etc., can be leveraged to identify neural processing regions and rates to achieve an optimal balance of accuracy, reliability, performance, power consumption, processing complexity, etc. For example, in some cases, if the CV system 100 experiences a high power consumption and/or a high temperature, the CV system 100 can reduce the neural network processing rate in regions having low attention votes from one or more computer vision functions as previously described. This can reduce the processing load by decreasing neural network processing and increasing use of optical flow calculations to update tracking results.

In some examples, the neural network loading can dynamically implement trade-offs between certain factors such as, for example, accuracy, power, and performance. Moreover, the CV system 100 can use attention factors (e.g., depth, optical flow, sky detection, occlusion, disocclusion, focus of expansion, visual saliency, etc.) to determine attention scores and/or votes from a set of computer vision functions (e.g., depth estimation, optical flow, sky detection, occlusion estimation, disocclusion estimation, focus of expansion estimation, visual saliency estimation, etc.). In some examples, the attention factors can include factors related to a specific scenario, such as a driving scenario. The object tracking performed by the CV system 100 according to the techniques described herein can provide object location updates based on optical flow and can ensure and/or increase a tracking accuracy using neural network processing.

Figure 16:
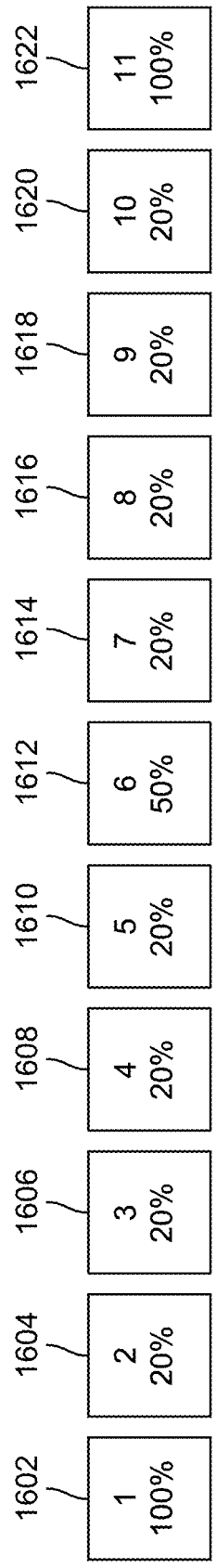
FIG. 16 is a diagram illustrating an example of dynamically changing neural network workloads, in accordance with some examples of the present disclosure.

FIG. 16 is a diagram illustrating an example of dynamically changing neural network workloads, in accordance with some examples of the present disclosure. As shown, the diagram shows dynamic neural network processing of frames 1602-1622. At frame 1602 (the first frame), the neural network can process the entire frame (e.g., 100% workload). In some cases, the neural network can also process the entire frame after every n number of frames are processed. For example, in the illustrative example shown in FIG. 17, the neural network workloads are dynamically varied as follows. For the next t seconds, the number of frames equals 20 frames-per-second times t seconds, which equals 20t. The most important and/or relevant 20% of the frame is processed every frame (e.g., at 20t), the most important and/or relevant 50% of the frame is processed every 5 frames (e.g., at 4t), and the entire frame is processed every 10 frames (e.g., at 2t).

Accordingly, in this example, the neural network processes the entire frame 1602 (e.g., 100% workload). After frame 1602, the neural network processes the most important and/or relevant 20% of frames 1604, 1606, 1608, and 1610 (e.g., 20% workloads for frames 1604-1610). Here, the neural network processes the regions of frames 1604-1610 that correspond to the most important and/or relevant 20% of the frames 1604-1610 as determined based on attention scores and/or votes as previously explained. At frame 1612, the neural network processes the most important and/or relevant 50% of the frame (e.g., 50% workload), as determined based on attention scores and/or votes. At frames 1614, 1616, 1618, and 1620, the neural network processes the most important and/or relevant 20% of each of the frames 1614-1620, as determined based on attention scores and/or votes. At frame 1622, the neural network processes the entire frame 1622 (e.g., 100% workload).

As shown, the dynamically changing neural network workloads can result in a significant workload reduction and a reduction in power and thermal requirements and/or conditions. The dynamic and adaptive neural network workloads can significantly reduce the average neural network workloads, processing demands and/or complexity, power consumption, temperature conditions, etc., while maintaining and/or increasing a processing efficiency, accuracy, reliability, performance, etc.

Figure 17:
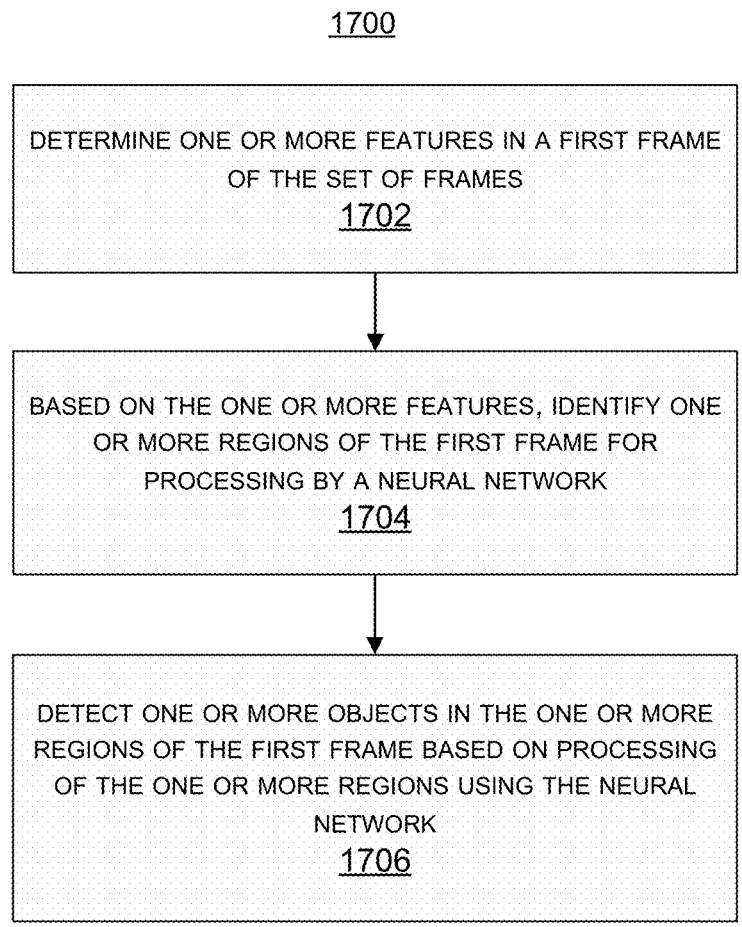
FIG. 17 and FIG. 18 are flowcharts illustrating example processes for vision perception processing, in accordance with some examples of the present disclosure.

The workloads, processing rates, variations, etc., shown in FIG. 17 are merely illustrative examples provided for explanation purposes. In other examples, the neural network can implement other workloads, processing rates, variations, etc. For example, in other cases, the neural network can process the first frame (e.g., frame 1602) in its entirety, the most important and/or relevant 30% of each subsequent frame, and the most important and/or relevant 75% of every $10^{th}$ frame.

FIG. 17 is a flowchart illustrating an example process 1700 for vision perception processing. At block 1702, the process 1700 can include determining one or more features in a first frame of a set of frames. In some examples, the process 1700 can include obtaining the set of frames from an image capture device. In some cases, the set of frames are part of a sequence of frames (e.g., a video or other sequence of frames). In some aspects, the one or more features can include low level features extracted from the first frame by one or more computer vision functions. For example, the one or more features can include depth, optical flow, visual saliency, sky detection features, occlusion and/or disocclusion features, and/or any other low level features.

At block 1704, the process 1700 can include identifying, based on the one or more features, one or more regions of the first frame for processing by a neural network. The one or more regions of the first frame can include one or more regions of attention, as described herein. In some examples, the one or more regions of the first frame can be identified based on attention votes provided by one or more computer vision functions used to extract the one or more features. For example, in some cases, the one or more regions of the first frame can include the frame regions having the $n^{th}$ highest number of attention votes from the one or more computer vision functions.

In some examples, the one or more regions can be less than the entire first frame. For example, a combination of the one or more regions can be smaller than a combination of all regions of the first frame.

At block 1706, the process 1700 can include detecting or tracking one or more objects in the one or more regions of the first frame using a neural network. For example, the process 1700 can include detecting or tracking one or more objects in the one or more regions of the first frame based on processing of the one or more regions using the neural network. In some cases, any region that is not processed using the neural network can be updated based on an optical flow calculated. For example, a region that is not processed using the neural network can instead be updated to reflect a movement from the calculated optical flow. The CV system 100 can adjust a placement and/or location of the region within the frame to account for the movement from the calculated optical flow.

In some aspects, the process 1700 can include calculating an attention demand score or characteristic per region of the first frame, generating attention votes per region based on the attention demand score or characteristic per region, and calculating an attention score or characteristic per region of the first frame based on a number of attention votes from one or more computer vision functions. In some examples, the attention votes per region can provide attention demands and/or attention requests.

In some aspects, the process 1700 can include identifying the one or more regions further based on the attention score or characteristic per region calculated based on the number of attention votes. In some examples, the one or more computer vision functions can include depth estimation, optical flow estimation, sky detection, occlusion detection, disocclusion detection, focus of expansion estimation, and/or visual saliency detection.

In some aspects, the process 1700 can include detecting or tracking one or more additional objects in one or more additional regions of the first frame based on processing the one or more additional regions using an optical flow tracker/algorithm.

In some cases, detecting or tracking the one or more objects in the one or more regions can include processing the one or more regions using the neural network after a certain number of frames from the set of frames.

In some aspects, the process 1700 can include generating, using the one or more features, a respective classification and bounding box for each object in the first frame.

In some cases, detecting or tracking the one or more objects in the one or more regions can include processing the one or more regions using the neural network and processing any other regions of the first frame without using the neural network.

In some aspects, the process 1700 can include determining a neural network load target for the neural network based on one or more constraints. In some examples, the one or more constraints for computing load capability dynamically can change based on a system performance, a component performance, a power consumption, temperature conditions of the system, resource conditions, system capabilities, and/or any other factor.

In some aspects, the process 1700 can include applying different frames-per-second rates of neural network processing for different regions. In some cases, the different frames-per-second rates for different regions are based on the identified regions (e.g., the identified regions of attention). In some examples, a first region having a higher attention score is processed by the neural network at a higher frames-per-second rate than a second region having a lower attention score.

In some aspects, the process 1700 can include using the neural network to process only one or more partial regions of the set of frames according to one or more respective frames-per-second rates. In some examples, the one or more regions selected for processing by the neural network include regions-of-attention associated with the first frame.

In some aspects, the process 1700 can include determining a number of regions and frames-per-second rates based on dynamically changing constraints for a compute load capability. In some aspects, the process 1700 can include determining that a total processor load associated with the number of regions and frames-per-second rates meets the dynamically changing constraints.

Figure 18:
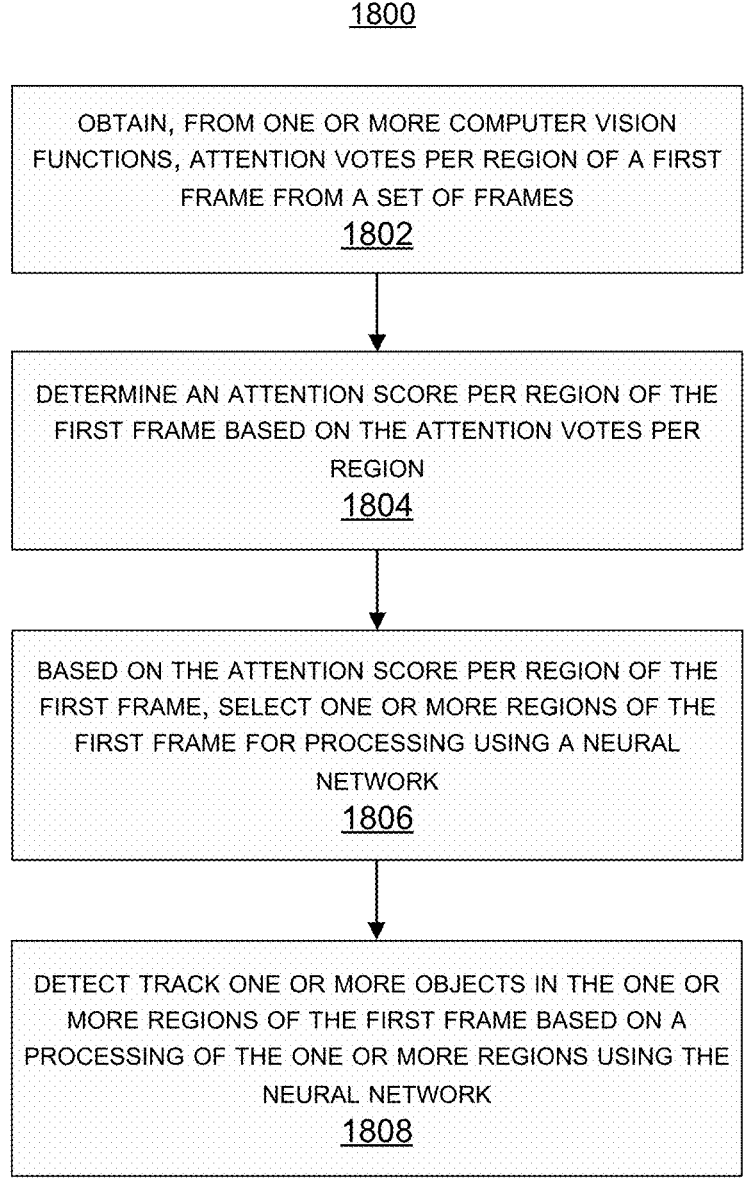

FIG. 18 is a flowchart illustrating another example of a process 1800 for vision perception. At block 1802, the process 1800 can include obtaining, from one or more computer vision functions, attention votes per region of a first frame from a set of frames. In some cases, the process 1800 can include obtaining the set of frames from an image capture device. In some examples, the set of frames can be part of a sequence of frames (e.g., a video or other sequence of frames). In some aspects, the attention votes per region can provide attention demands and/or attention requests. In some cases, the one or more computer vision functions can include one or more functions for depth estimation, optical flow estimation, sky detection, occlusion detection, disocclusion detection, focus of expansion estimation, and/or visual saliency detection.

In some cases, the one or more computer vision functions can be used to extract features from the first frame (and any other frame from the set of frames). In some examples, the attention votes per region can be determined based on an attention demand score or characteristic per region of the first frame determined. In some examples, each of one or more computer vision functions used to extract features from the first frame can provide a score for each region of the first frame.

At block 1804, the process 1800 can include determining an attention score per region of the first frame based on the attention votes per region. In some examples, the attention score for each region can be determined based on a respective number of attention votes associated with that region. For example, the attention score for each region can be determined based on a respective number of attention votes obtained for that region from the one or more computer vision functions.

At block 1806, the process 1800 can include selecting, based on the attention score per region of the first frame, one or more regions of the first frame for processing using a neural network. In some examples, the one or more regions can include one or more regions of attention (e.g., one or more regions of interest) identified as further described herein.

At block 1808, the process 1800 can include detecting and/or tracking one or more objects in the one or more regions of the first frame based on a processing of the one or more regions using the neural network. For example, the neural network can process the one or more regions to detect and/or track one or more objects in the one or more regions of the first frame.

In some examples, the one or more regions of the first frame can be processed using a neural network, and one or more additional regions of the first frame can be processed using one or more computer vision algorithms (e.g., an optical flow algorithm, etc.). In some cases, the processing of the one or more regions using the neural network can be based on the attention score per region of the first frame. For example, the one or more regions can be selected for processing via the neural network based on associated attention scores of the one or more regions.

In some aspects, the process 1800 can include determining one or more features in the first frame, determining an attention demand score or characteristic per region of the first frame at least partly based on the one or more features in the first frame, and determining the attention score per region based on the attention demand score or characteristic per region. In some cases, the one or more features can include depth information, optical flow information, sky detection information, an occlusion map, a disocclusion map, focus of expansion information, and/or visual saliency information.

In some aspects, the process 1800 can include detecting and/or tracking one or more additional objects in one or more additional regions of the first frame using an optical flow algorithm. In some examples, detecting and/or tracking the one or more additional objects in the one or more additional regions of the first frame can include processing the one or more additional regions using the optical flow algorithm and refraining from processing the one or more additional regions using the neural network.

In some examples, detecting and/or tracking the one or more objects in the one or more regions of the first frame can include refraining from using the neural network to process one or more additional regions of the first frame and, after processing a predetermined number of frames from the set of frames, processing, using the neural network, a portion of a second frame. In some examples, the portion of the second frame can correspond to at least one of the one or more additional regions.

In some aspects, the process 1800 can include generating, using one or more features of the first frame, a classification and bounding box for the one or more objects.

In some cases, detecting and/or tracking the one or more objects in the one or more regions can include processing the one or more regions using the neural network and processing one or more additional regions of the first frame without using the neural network.

In some aspects, the process 1800 can include determining a neural network load target for the neural network based on one or more constraints. In some examples, the one or more constraints can include a system performance, a system component performance, a power consumption, and/or temperature conditions associated with a computing device (e.g., CV system 100).

In some aspects, the process 1800 can include applying a different frames-per-second rate of neural network processing for different frame regions. In some cases, the different frames-per-second rate is based on the selected one or more regions of the first frame.

In some examples, the one or more regions include a first region and a second region. In some examples, the first region has a higher attention score than the second region, and the first region having the higher attention score is processed using the neural network at a higher frames-per-second rate than the second region having a lower attention score.

In some aspects, the process 1800 can include using the neural network to process only one or more partial regions of the set of frames according to one or more respective processing rates. In some examples, the one or more partial regions of the set of frames can include the one or more regions of the first frame.

In some aspects, the process 1800 can include determining, based on dynamically changing constraints for a compute load capability, a number of regions to process using the neural network and one or more frames-per-second rates for processing frame regions using the neural network. In some aspects, the process 1800 can include determining that a total processor load associated with the number of regions and the one or more frames-per-second rates meets the dynamically changing constraints.

In some examples, the process 1800 can include determining one or more features in the first frame. In some cases, the one or more features can include depth information, optical flow information, sky detection information, an occlusion map, a disocclusion map, focus of expansion information, a segmentation map, and/or visual saliency information. In some cases, the one or more regions of the first frame can be identified based at least partly on the one or more features.

In some examples, the process 1700 and/or the process 1800 may be performed by one or more computing devices or apparatuses. In one illustrative example, the process 1700 and/or the process 1800 can be performed by the CV system 100 shown in FIG. 1. In some examples, the process 1700 and/or the process 1800 can be performed by one or more computing devices with the computing device architecture 1900 shown in FIG. 19. In some cases, such a computing device or apparatus may include a processor, microprocessor, microcomputer, or other component of a device that is configured to carry out the steps of the process 1700 and/or the process 1800. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1700 and the process 1800 are illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1700 and/or the process 1800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 19:
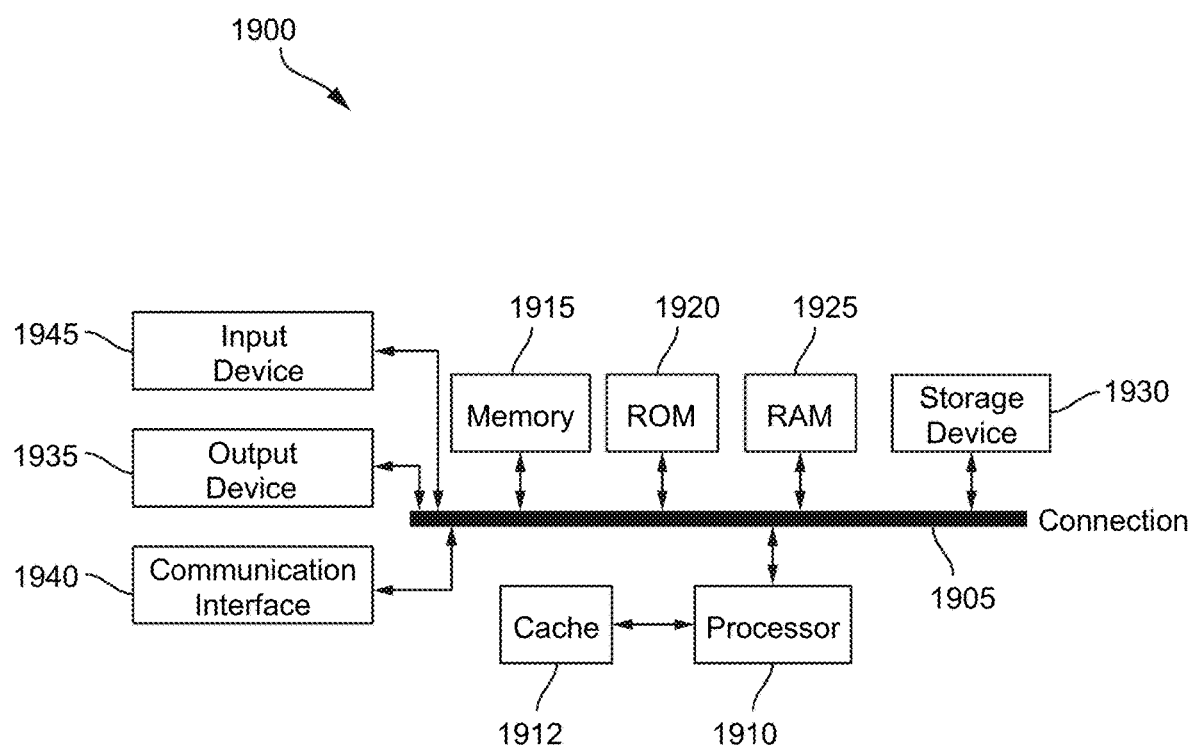
FIG. 19 illustrates an example computing device architecture, in accordance with some examples of the present disclosure.

FIG. 19 illustrates an example computing device architecture 1900 of an example computing device which can implement various techniques described herein. For example, the computing device architecture 1900 can implement at least some portions of the CV system 100 shown in FIG. 1. The components of the computing device architecture 1900 are shown in electrical communication with each other using a connection 1905, such as a bus. The example computing device architecture 1900 includes a processing unit (CPU or processor) 1910 and a computing device connection 1905 that couples various computing device components including the computing device memory 1915, such as read only memory (ROM) 1920 and random access memory (RAM) 1925, to the processor 1910.

The computing device architecture 1900 can include a cache of high-speed memory connected directly with, in close proximity to, or integrated as part of the processor 1910. The computing device architecture 1900 can copy data from the memory 1915 and/or the storage device 1930 to the cache 1912 for quick access by the processor 1910. In this way, the cache can provide a performance boost that avoids processor 1910 delays while waiting for data. These and other modules can control or be configured to control the processor 1910 to perform various actions. Other computing device memory 1915 may be available for use as well. The memory 1915 can include multiple different types of memory with different performance characteristics. The processor 1910 can include any general-purpose processor and a hardware or software service stored in storage device 1930 and configured to control the processor 1910 as well as a special-purpose processor where software instructions are incorporated into the processor design. The processor 1910 may be a self-contained system, containing multiple cores or processors, a bus, memory controller, cache, etc. A multi-core processor may be symmetric or asymmetric.

To enable user interaction with the computing device architecture 1900, an input device 1945 can represent any number of input mechanisms, such as a microphone for speech, a touch-sensitive screen for gesture or graphical input, keyboard, mouse, motion input, speech and so forth. An output device 1935 can also be one or more of a number of output mechanisms known to those of skill in the art, such as a display, projector, television, speaker device. In some instances, multimodal computing devices can enable a user to provide multiple types of input to communicate with the computing device architecture 1900. The communication interface 1940 can generally govern and manage the user input and computing device output. There is no restriction on operating on any particular hardware arrangement and therefore the basic features here may easily be substituted for improved hardware or firmware arrangements as they are developed.

Storage device 1930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1925, read only memory (ROM) 1920, and hybrids thereof. The storage device 1930 can include software, code, firmware, etc., for controlling the processor 1910. Other hardware or software modules are contemplated. The storage device 1930 can be connected to the computing device connection 1905. In one aspect, a hardware module that performs a particular function can include the software component stored in a computer-readable medium in connection with the necessary hardware components, such as the processor 1910, connection 1905, output device 1935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for processing image data, the apparatus comprising: memory; and one or more processors coupled to the memory, the one or more processors configured to: obtain, from an image capture device, a set of frames of a sequence of frames; determine one or more features in a first frame of the set of frames; based on the one or more features, identify one or more regions of the first frame for processing by a neural network; and detect one or more objects in the one or more regions of the first frame based on processing of the one or more regions using the neural network.

Aspect 2: The apparatus of Aspect 1, wherein the one or more processors are configured to: calculate an attention demand score or characteristic per region of the first frame; generate attention votes per region based on the attention demand score or characteristic per region, the attention votes per region providing at least one of attention demands and attention requests; and calculate an attention score or characteristic per region of the first frame based on a number of attention votes from one or more computer vision functions.

Aspect 3: The apparatus of any of Aspects 1 to 2, wherein the one or more processors are configured to identify the one or more regions further based on the attention score or characteristic per region calculated based on the number of attention votes.

Aspect 4: The apparatus of any of Aspects 2 or 3, wherein the one or more computer vision functions comprise at least one of depth estimation, optical flow estimation, sky detection, occlusion detection, disocclusion detection, focus of expansion, and visual saliency detection.

Aspect 5: The apparatus of any of Aspects 1 to 4, wherein the one or more processors are configured to detect or track one or more additional objects in one or more additional regions of the first frame based on processing the one or more additional regions using an optical flow algorithm.

Aspect 6: The apparatus of any of Aspects 1 to 5, wherein the one or more features comprise at least one of depth information, optical flow information, sky detection information, an occlusion map, a disocclusion map, focus of expansion information, and visual saliency information.

Aspect 7: The apparatus of any of Aspects 1 to 6, wherein, to detect the one or more objects in the one or more regions, the one or more processors are configured to process the one or more regions using the neural network after a certain number of frames from the set of frames.

Aspect 8: The apparatus of any of Aspects 1 to 7, wherein the one or more processors are configured to generate, using the one or more features, a respective classification and bounding box for each object in the first frame.

Aspect 9: The apparatus of any of Aspects 1 to 8, wherein, to detect the one or more objects in the one or more regions, the one or more processors are configured to process the one or more regions using the neural network and process any other regions of the first frame without using the neural network.

Aspect 10: The apparatus of Aspect 9, wherein a combination of the one or more regions is smaller than a combination of all regions of the first frame.

Aspect 11: The apparatus of any of Aspects 1 to 10, wherein the one or more processors are configured to determine a neural network load target for the neural network based on one or more constraints.

Aspect 12: The apparatus of Aspect 11, wherein the one or more constraints for computing load capability dynamically change at least one of a system performance, a system component performance, a power consumption, and thermal temperature conditions of the apparatus.

Aspect 13: The apparatus of any of Aspects 1 to 12, wherein the one or more processors are configured to apply different frames-per-second rates of neural network processing for different regions.

Aspect 14: The apparatus of Aspect 13, wherein the different frames-per-second rates for different regions are based on the identified regions-of-attention.

Aspect 15: The apparatus of any of Aspects 13 or 14, wherein a first region having a higher attention score is processed by the neural network at a higher frames-per-second rate than a second region having a lower attention score.

Aspect 16: The apparatus of any of Aspects 1 to 15, wherein the one or more processors are configured to use the neural network to process only one or more partial regions of the set of frames according to one or more respective frames-per-second rates.

Aspect 17: The apparatus of any of Aspects 1 to 16, wherein the one or more regions selected for processing by the neural network include regions-of-attention associated with the first frame.

Aspect 18: The apparatus of any of Aspects 1 to 17, wherein the apparatus is used as a vision perception function in an advanced driver assist system.

Aspect 19: The apparatus of any of Aspects 1 to 18, wherein the apparatus comprises one or more cameras generating one or more streams of vision frames.

Aspect 20: The apparatus of any of Aspects 1 to 19, wherein the one or more processors are configured to determine a number of regions and frames-per-second rates based on dynamically changing constraints for computing load capability.

Aspect 21: The apparatus of Aspect 20, wherein the one or more processors are configured to determine that a total processor load associated with the number of regions and frames-per-second rates meets the dynamically changing constraints.

Aspect 22: An apparatus comprising: memory; and one or more processors coupled to the memory, the one or more processors configured to: obtain, from an image capture device, a set of frames of a sequence of frames; calculate an attention demand score or characteristic per region of a first frame; generate attention votes per region based on the attention demand score per region, the attention votes per region providing at least one of attention demands and attention requests; calculate an attention score or characteristic per region of the first frame based on a number of attention votes from one or more computer vision functions; and detect one or more objects in one or more regions of the first frame based on processing of the one or more regions using a neural network, the one or more regions being processed using the neural network based on the attention score or characteristic associated with the one or more regions.

Aspect 23: The apparatus of Aspect 22, wherein the one or more processors are configured to identify the one or more regions further based on the attention score or characteristic per region calculated based on the number of attention votes.

Aspect 24: The apparatus of any of Aspects 22 or 23, wherein the one or more computer vision functions comprise at least one of depth estimation, optical flow estimation, sky detection, occlusion detection, disocclusion detection, focus of expansion, and visual saliency detection.

Aspect 25: The apparatus of any of Aspects 22 to 24, wherein the one or more processors are configured to determine one or more features in the first frame of the set of frames, and wherein the attention demand score or characteristic per region of the first frame is calculated at least partly based on the one or more features in the first frame.

Aspect 26: The apparatus of Aspect 25, wherein the one or more features comprise at least one of depth information, optical flow information, sky detection information, an occlusion map, a disocclusion map, focus of expansion information, and visual saliency information.

Aspect 27: The apparatus of any of Aspects 22 to 26, wherein one or more processors are configured to detect one or more additional objects in one or more additional regions of the first frame based on processing the one or more additional regions using an optical flow algorithm.

Aspect 28: The apparatus of any of Aspects 22 to 27, wherein, to detect the one or more objects in the one or more regions, the one or more processors are configured to process the one or more regions using the neural network after a certain number of frames from the set of frames.

Aspect 29: The apparatus of any of Aspects 22 to 28, wherein the one or more processors are configured to generate, using one or more features of the first frame, a respective classification and bounding box for each object in the first frame.

Aspect 30: The apparatus of any of Aspects 22 to 29, wherein, to detect the one or more objects in the one or more regions, the one or more processors are configured to process the one or more regions using the neural network and process any other regions of the first frame without using the neural network.

Aspect 31: The apparatus of Aspect 30, wherein a combination of the one or more regions is smaller than a combination of all regions of the first frame.

Aspect 32: The apparatus of any of Aspects 22 to 31, wherein the one or more processors are configured to determine a neural network load target for the neural network based on one or more constraints.

Aspect 33: The apparatus of Aspect 32, wherein the one or more constraints comprise at least one of a system performance, a system component performance, a power consumption, and thermal temperature conditions.

Aspect 34: The apparatus of any of Aspects 22 to 33, wherein the one or more processors are configured to apply a different frames-per-second rate of neural network processing for different frame regions.

Aspect 35: The apparatus of Aspect 34, wherein the different frames-per-second rate is based on the identified regions-of-attention.

Aspect 36: The apparatus of any of Aspects 34 or 35, wherein a first region having a higher attention score is processed by the neural network at a higher frames-per-second rate than a second region having a lower attention score.

Aspect 37: The apparatus of any of Aspects 22 to 36, wherein the one or more processors are configured to use the neural network to process only one or more partial regions of the set of frames according to one or more respective frames-per-second rates.

Aspect 38: The apparatus of any of Aspects 22 to 37, wherein the one or more frame regions selected for processing by the neural network include regions-of-attention associated with the first frame.

Aspect 39: The apparatus of any of Aspects 22 to 38, wherein the one or more processors are configured to determine a number of regions and frames-per-second rates based on dynamically changing constraints for computing load capability.

Aspect 40: The apparatus of Aspect 39, wherein the one or more processors are configured to determine that a total processor load associated with the number of regions and frames-per-second rates meets the dynamically changing constraints.

Aspect 41: The apparatus of any of Aspects 22 to 40, wherein the apparatus comprises an advanced driver assist system.

Aspect 42: The apparatus of any of Aspects 22 to 41, wherein the apparatus comprises one or more cameras generating one or more streams of vision frames.

Aspect 43: A method for processing image data, the method comprising: obtaining, from an image capture device, a set of frames of a sequence of frames; determining one or more features in a first frame of the set of frames; based on the one or more features, identifying one or more regions of the first frame for processing by a neural network;

and detecting one or more objects in the one or more regions of the first frame based on processing of the one or more regions using the neural network.

Aspect 44: The method of Aspect 43, further comprising: calculating an attention demand score or characteristic per region of the first frame; generating attention votes per region based on the attention demand score or characteristic per region, the attention votes per region providing at least one of attention demands and attention requests; and calculating an attention score or characteristic per region of the first frame based on a number of attention votes from one or more computer vision functions.

Aspect 45: The method of Aspect 44, further comprising identifying the one or more regions further based on the attention score or characteristic per region calculated based on the number of attention votes.

Aspect 46: The method of any of Aspects 44 or 45, wherein the one or more computer vision functions comprise at least one of depth estimation, optical flow estimation, sky detection, occlusion detection, disocclusion detection, focus of expansion, and visual saliency detection.

Aspect 47: The method of any of Aspects 43 to 46, further comprising detecting one or more additional objects in one or more additional regions of the first frame based on processing the one or more additional regions using an optical flow algorithm.

Aspect 48: The method of any of Aspects 43 to 47, wherein the one or more features comprise at least one of depth information, optical flow information, sky detection information, an occlusion map, a disocclusion map, focus of expansion information, and visual saliency information.

Aspect 49: The method of any of Aspects 43 to 48, wherein detecting the one or more objects in the one or more regions comprises processing the one or more regions using the neural network after a certain number of frames from the set of frames.

Aspect 50: The method of any of Aspects 43 to 49, further comprising generating, using the one or more features, a respective classification and bounding box for each object in the first frame.

Aspect 51: The method of any of Aspects 43 to 50, wherein detecting the one or more objects in the one or more regions comprises processing the one or more regions using the neural network and process any other regions of the first frame without using the neural network.

Aspect 52: The method of Aspect 51, wherein a combination of the one or more regions is smaller than a combination of all regions of the first frame.

Aspect 53: The method of any of Aspects 43 to 52, further comprising determining a neural network load target for the neural network based on one or more constraints.

Aspect 54: The method of Aspect 53, wherein the one or more constraints comprise at least one of a system performance, a system component performance, a power consumption, and thermal temperature conditions.

Aspect 55: The method of any of Aspects 43 to 54, further comprising applying a different frames-per-second rate of neural network processing for different frame regions.

Aspect 56: The method of Aspect 55, wherein the different frames-per-second rate is based on the identified regions-of-attention.

Aspect 57: The method of any of Aspects 55 or 56, wherein a first region having a higher attention score is processed by the neural network at a higher frames-per-second rate than a second region having a lower attention score.

Aspect 58: The method of any of Aspects 43 to 57, further comprising using the neural network to process only one or more partial regions of the set of frames according to one or more respective frames-per-second rates.

Aspect 59: The method of any of Aspects 43 to 58, wherein the one or more frame regions selected for processing by the neural network include regions-of-attention associated with the first frame.

Aspect 60: The method of any of Aspects 43 to 59, further comprising determining a number of regions and frames-per-second rates based on dynamically changing constraints for computing load capability.

Aspect 61: The method of Aspect 60, further comprising determining that a total processor load associated with the number of regions and frames-per-second rates meets the dynamically changing constraints.

Aspect 62: A method comprising: obtaining, from an image capture device, a set of frames of a sequence of frames; calculating an attention demand score or characteristic per region of a first frame; generating attention votes per region based on the attention demand score per region, the attention votes per region providing at least one of attention demands and attention requests; calculating an attention score or characteristic per region of the first frame based on a number of attention votes from one or more computer vision functions; and detecting one or more objects in one or more regions of the first frame based on processing of the one or more regions using the neural network, the one or more regions being processed using the neural network based on the attention score or characteristic associated with the one or more regions.

Aspect 63: The method of Aspect 62, further comprising identifying the one or more regions further based on the attention score or characteristic per region calculated based on the number of attention votes.

Aspect 64: The method of any of Aspects 62 or 63, wherein the one or more computer vision functions comprise at least one of depth estimation, optical flow estimation, sky detection, occlusion detection, disocclusion detection, focus of expansion, and visual saliency detection.

Aspect 65: The method of any of Aspects 62 to 64, further comprising determining one or more features in the first frame of the set of frames, and wherein the attention demand score or characteristic per region of the first frame is calculated at least partly based on the one or more features in the first frame.

Aspect 66: The method of Aspect 65, wherein the one or more features comprise at least one of depth information, optical flow information, sky detection information, an occlusion map, a disocclusion map, focus of expansion information, and visual saliency information.

Aspect 67: The method of any of Aspects 62 to 66, further comprising detecting one or more additional objects in one or more additional regions of the first frame based on processing the one or more additional regions using an optical flow algorithm.

Aspect 68: The method of any of Aspects 62 to 67, wherein detecting the one or more objects in the one or more regions comprises processing the one or more regions using the neural network after a certain number of frames from the set of frames.

Aspect 69: The method of any of Aspects 62 to 68, further comprising generating, using one or more features of the first frame, a respective classification and bounding box for each object in the first frame.

Aspect 70: The method of any of Aspects 62 to 69, wherein detecting the one or more objects in the one or more regions comprises processing the one or more regions using the neural network and process any other regions of the first frame without using the neural network.

Aspect 71: The method of Aspect 70, wherein a combination of the one or more regions is smaller than a combination of all regions of the first frame.

Aspect 72: The method of any of Aspects 62 to 71, further comprising determining a neural network load target for the neural network based on one or more constraints.

Aspect 73: The method of Aspect 72, wherein the one or more constraints comprise at least one of a system performance, a system component performance, a power consumption, and thermal temperature conditions.

Aspect 74: The method of any of Aspects 62 to 73, further comprising applying a different frames-per-second rate of neural network processing for different frame regions.

Aspect 75: The method of Aspect 74, wherein the different frames-per-second rate is based on the identified regions-of-attention.

Aspect 76: The method of Aspect 75, wherein a first region having a higher attention score is processed by the neural network at a higher frames-per-second rate than a second region having a lower attention score.

Aspect 77: The method of any of Aspects 62 to 76, further comprising using the neural network to process only one or more partial regions of the set of frames according to one or more respective frames-per-second rates.

Aspect 78: The method of any of Aspects 62 to 77, wherein the one or more frame regions selected for processing by the neural network include regions-of-attention associated with the first frame.

Aspect 79: The method of any of Aspects 62 to 78, further comprising determining a number of regions and frames-per-second rates based on dynamically changing constraints for computing load capability.

Aspect 80: The method of Aspect 79, further comprising determining that a total processor load associated with the number of regions and frames-per-second rates meets the dynamically changing constraints.

Aspect 81: A non-transitory computer-readable medium having stored thereon instructions that, when executed by one or more processors, cause the one or more processors to perform a method according to any of Aspects 43 to 61.

Aspect 82: A non-transitory computer-readable medium having stored thereon instructions that, when executed by one or more processors, cause the one or more processors to perform a method according to any of Aspects 62 to 80.

Aspect 83: An apparatus comprising means for performing a method according to any of Aspects 43 to 61.

Aspect 84: An apparatus comprising means for performing a method according to any of Aspects 62 to 80.

Aspect 85. A method comprising: obtaining, from one or more computer vision functions, attention votes per region of a first frame from a set of frames, the attention votes per region providing at least one of attention demands and attention requests; determining an attention score per region of the first frame based on the attention votes per region, the attention score for each region being based on a respective number of attention votes associated with each region; based on the attention score per region of the first frame, selecting one or more regions of the first frame for processing using a neural network; and detecting one or more objects in the one or more regions of the first frame based on a processing of the one or more regions using the neural network.

Aspect 86. The method of Aspect 85, further comprising: determining one or more features in the first frame; determining an attention demand score or characteristic per region of the first frame at least partly based on the one or more features in the first frame; and determining the attention score per region based on the attention demand score or characteristic per region.

Aspect 87. The method of Aspect 86, wherein the one or more features comprise at least one of depth information, optical flow information, sky detection information, an occlusion map, a disocclusion map, focus of expansion information, and visual saliency information.

Aspect 88. The method of any of Aspects 85 to 87, further comprising: detecting one or more additional objects in one or more additional regions of the first frame using an optical flow algorithm.

Aspect 89. The method of Aspect 88, wherein detecting the one or more additional objects in the one or more additional regions of the first frame comprises processing the one or more additional regions using the optical flow algorithm and refraining from processing the one or more additional regions using the neural network.

Aspect 90. The method of any of Aspects 85 to 89, wherein the one or more computer vision functions comprise at least one of depth estimation, optical flow estimation, sky detection, occlusion detection, disocclusion detection, focus of expansion estimation, and visual saliency detection.

Aspect 91. The method of any of Aspects 85 to 90, wherein detecting the one or more objects in the one or more regions of the first frame comprises: refraining from using the neural network to process one or more additional regions of the first frame; and after processing a predetermined number of frames from the set of frames, processing, using the neural network, a portion of a second frame, the portion of the second frame corresponding to at least one of the one or more additional regions.

Aspect 92. The method of any of Aspects 85 to 91, further comprising: generating, using one or more features of the first frame, a classification and bounding box for the one or more objects.

Aspect 93. The method of any of Aspects 85 to 92, wherein detecting the one or more objects in the one or more regions comprises processing the one or more regions using the neural network and process one or more additional regions of the first frame without using the neural network.

Aspect 94. The method of any of Aspects 85 to 93, wherein a combination of the one or more regions of the first frame is smaller than a combination of all regions of the first frame, and wherein the one or more regions of the first frame comprise one or more regions of attention determined in the first frame.

Aspect 95. The method of any of Aspects 85 to 94, further comprising determining a neural network load target for the neural network based on one or more constraints.

Aspect 96. The method of Aspect 95, wherein the one or more constraints comprise at least one of a system performance, a system component performance, a power consumption, and temperature conditions associated with a computing device.

Aspect 97. The method of any of Aspects 85 to 96, further comprising applying a different frames-per-second rate of neural network processing for different frame regions.

Aspect 98. The method of Aspect 97, wherein the different frames-per-second rate is based on the selected one or more regions of the first frame.

Aspect 99. The method of any of Aspects 85 to 98, wherein the one or more regions comprise a first region and a second region, wherein the first region has a higher attention score than the second region, and wherein the first region having the higher attention score is processed using the neural network at a higher frames-per-second rate than the second region having a lower attention score.

Aspect 100. The method of any of Aspects 85 to 99, further comprising using the neural network to process only one or more partial regions of the set of frames according to one or more respective processing rates, the one or more partial regions of the set of frames comprising the one or more regions of the first frame.

Aspect 101. The method of any of Aspects 85 to 100, further comprising: determining, based on dynamically changing constraints for a compute load capability, a number of regions to process using the neural network and one or more frames-per-second rates for processing frame regions using the neural network.

Aspect 102. The method of Aspect 101, further comprising determining that a total processor load associated with the number of regions and the one or more frames-per-second rates meets the dynamically changing constraints.

Aspect 103. An apparatus comprising a memory and one or more processors coupled to the memory, the one or more processors configured to perform a method according to any of Aspects 85 to 102.

Aspect 104. An apparatus comprising means for performing a method according to any of Aspects 85 to 102.

Aspect 105. A non-transitory computer-readable medium having stored thereon instructions which, when executed by one or more processors, cause the one or more processors to perform a method according to any of Aspects 85 to 102.

What is claimed is:

1. An apparatus for vision perception, the apparatus comprising:
    memory; and
    one or more processors coupled to the memory, the one or more processors configured to:
        obtain, from one or more computer vision functions, attention votes per region of a first frame from a set of frames, the attention votes per region providing at least one of attention demands and attention requests;
        determine an attention score per region of the first frame based on the attention votes per region, the attention score for each region being based on a respective number of attention votes associated with each region;
        based on the attention score per region of the first frame, select one or more regions of the first frame for processing using a neural network; and
        detect one or more objects in the one or more regions of the first frame based on a processing of the one or more regions using the neural network.

2. The apparatus of claim 1, wherein the one or more processors are configured to:
    determine one or more features in the first frame;
    determine an attention demand score or characteristic per region of the first frame at least partly based on the one or more features in the first frame; and
    determine the attention score per region based on the attention demand score or characteristic per region.

3. The apparatus of claim 2, wherein the one or more features comprise at least one of depth information, optical flow information, sky detection information, an occlusion map, a disocclusion map, focus of expansion information, and visual saliency information.

4. The apparatus of claim 1, wherein the one or more processors are configured to detect one or more additional objects in one or more additional regions of the first frame using an optical flow algorithm.

5. The apparatus of claim 4, wherein, to detect the one or more additional objects in the one or more additional regions of the first frame, the one or more processors are configured to process the one or more additional regions using the optical flow algorithm and refrain from processing the one or more additional regions using the neural network.

6. The apparatus of claim 1, wherein the one or more computer vision functions comprise at least one of depth estimation, optical flow estimation, sky detection, occlusion detection, disocclusion detection, focus of expansion estimation, and visual saliency detection.

7. The apparatus of claim 1, wherein, to detect the one or more objects in the one or more regions of the first frame, the one or more processors are configured to:
    refrain from using the neural network to process one or more additional regions of the first frame; and
    after processing a predetermined number of frames from the set of frames, process, using the neural network, a portion of a second frame, the portion of the second frame corresponding to at least one of the one or more additional regions.

8. The apparatus of claim 1, wherein the one or more processors are configured to generate, using one or more features of the first frame, a classification and bounding box for the one or more objects.

9. The apparatus of claim 1, wherein, to detect the one or more objects in the one or more regions, the one or more processors are configured to process the one or more regions using the neural network and process one or more additional regions of the first frame without using the neural network.

10. The apparatus of claim 1, wherein a combination of the one or more regions of the first frame is smaller than a combination of all regions of the first frame, and wherein the one or more regions of the first frame comprise one or more regions of attention determined in the first frame.

11. The apparatus of claim 1, wherein the one or more processors are configured to determine a neural network load target for the neural network based on one or more constraints.

12. The apparatus of claim 11, wherein the one or more constraints comprise at least one of a system performance, a system component performance, a power consumption, and temperature conditions associated with the apparatus.

13. The apparatus of claim 1, wherein the one or more processors are configured to apply a different frames-per-second rate of neural network processing for different frame regions.

14. The apparatus of claim 13, wherein the different frames-per-second rate is based on the selected one or more regions of the first frame.

15. The apparatus of claim 1, wherein the one or more regions comprise a first region and a second region, wherein the first region has a higher attention score than the second region, and wherein the first region having the higher attention score is processed using the neural network at a higher frames-per-second rate than the second region having a lower attention score.

16. The apparatus of claim 1, wherein the one or more processors are configured to use the neural network to process only one or more partial regions of the set of frames according to one or more respective processing rates, the one or more partial regions of the set of frames comprising the one or more regions of the first frame.

17. The apparatus of claim 1, wherein the one or more processors are configured to:
    determine, based on dynamically changing constraints for a compute load capability, a number of regions to process using the neural network and one or more frames-per-second rates for processing frame regions using the neural network.

18. The apparatus of claim 17, wherein the one or more processors are configured to determine that a total processor load associated with the number of regions and the one or more frames-per-second rates meets the dynamically changing constraints.

19. The apparatus of claim 1, wherein the apparatus comprises an advanced driver assist system.

20. The apparatus of claim 1, wherein the apparatus comprises an image capture device configured to capture the set of frames.

21. A method for vision perception, comprising:
obtaining, from one or more computer vision functions, attention votes per region of a first frame of a set of frames, the attention votes per region providing at least one of attention demands and attention requests;
determining an attention score per region of the first frame based on the attention votes per region, the attention score for each region being based on a respective number of attention votes associated with that region;
based on the attention score per region of the first frame, selecting one or more regions of the first frame for processing using a neural network; and
detecting one or more objects in the one or more regions of the first frame based on a processing of the one or more regions using the neural network.

22. The method of claim 21, further comprising:
determining one or more features in the first frame;
determining an attention demand score or characteristic per region of the first frame at least partly based on the one or more features in the first frame; and
determining the attention score per region based on the attention demand score or characteristic per region.

23. The method of claim 22, wherein the one or more features comprise at least one of depth information, optical flow information, sky detection information, an occlusion map, a disocclusion map, focus of expansion information, and visual saliency information.

24. The method of claim 21, further comprising:
detecting one or more additional objects in one or more additional regions of the first frame using an optical flow algorithm; and
refraining from processing the one or more additional regions using the neural network.

25. The method of claim 21, wherein detecting the one or more objects in the one or more regions of the first frame comprises:
refraining from using the neural network to process one or more additional regions of the first frame; and
after processing a predetermined number of frames from the set of frames, processing, using the neural network, a portion of a second frame, the portion of the second frame corresponding to at least one of the one or more additional regions.

26. The method of claim 21, further comprising determining a neural network load target for the neural network based on one or more constraints, wherein the one or more constraints comprise at least one of a system performance, a system component performance, a power consumption, and temperature conditions associated with a computing device.

27. The method of claim 21, further comprising applying a different frames-per-second rate of neural network processing for different frame regions.

28. The method of claim 21, wherein the one or more regions comprise a first region and a second region, wherein the first region has a higher attention score than the second region, and wherein the first region having the higher attention score is processed using the neural network at a higher frames-per-second rate than the second region having a lower attention score.

29. The method of claim 21, further comprising:
determining, based on dynamically changing constraints for a compute load capability, a number of regions to process using the neural network and one or more frames-per-second rates for processing frame regions using the neural network.

30. At least one non-transitory computer-readable medium containing instructions which, when executed by one or more processors, cause the one or more processors to:
obtain, from an image capture device, a set of frames of a sequence of frames;
determine one or more features in a first frame of the set of frames;
based on the one or more features, identify one or more regions of the first frame for processing by a neural network;
detect one or more objects in the one or more regions of the first frame based on processing of the one or more regions using the neural network;
determine an attention demand score per region of the first frame;
determine attention votes per region based on the attention demand score per region, the attention votes per region providing at least one of attention demands and attention requests;
determine an attention score per region of the first frame based on a number of attention votes; and
identify the one or more regions, based on the attention score per region, for processing by the neural network.

* * * * *